(12) United States Patent
Cai et al.

(10) Patent No.: US 7,738,573 B2
(45) Date of Patent: Jun. 15, 2010

(54) SYSTEM AND METHOD FOR CREST FACTOR REDUCTION

(75) Inventors: Khiem V. Cai, Brea, CA (US); Samuel Davis Kent, III, Long Beach, CA (US); Don C. Devendorf, Carlsbad, CA (US)

(73) Assignee: Microelectronics Technology Inc. (TW)

( * ) Notice: Subject to any disclaimer, the term of this patent is extended or adjusted under 35 U.S.C. 154(b) by 800 days.

(21) Appl. No.: 11/246,027

(22) Filed: Oct. 7, 2005

(65) Prior Publication Data

US 2006/0120479 A1    Jun. 8, 2006

Related U.S. Application Data

(60) Provisional application No. 60/616,716, filed on Oct. 7, 2004.

(51) Int. Cl.
*H04K 1/10* (2006.01)

(52) U.S. Cl. .................... 375/260; 370/206; 370/208; 370/210; 370/236; 370/342; 370/343; 370/480; 375/135; 375/296

(58) Field of Classification Search ........... 375/260, 375/135, 296; 370/206, 208, 210, 236, 342, 370/343, 480
See application file for complete search history.

(56) References Cited

U.S. PATENT DOCUMENTS

| | | | | |
|---|---|---|---|---|
| 5,604,462 A | * | 2/1997 | Gans et al. | 330/124 R |
| 5,852,630 A | * | 12/1998 | Langberg et al. | 375/219 |
| 6,639,537 B1 | * | 10/2003 | Raz | 341/155 |
| 6,944,423 B2 | * | 9/2005 | Chen | 455/3.02 |
| 6,983,026 B2 | * | 1/2006 | Pinckley et al. | 375/296 |
| 7,095,798 B2 | * | 8/2006 | Hunton | 375/296 |
| 7,259,630 B2 | * | 8/2007 | Bachman et al. | 330/297 |
| 7,336,724 B2 | * | 2/2008 | Jaenecke et al. | 375/296 |
| 7,340,005 B2 | * | 3/2008 | Kim et al. | 375/296 |
| 7,362,819 B2 | * | 4/2008 | Obernosterer et al. | 375/296 |
| 2004/0014436 A1 | * | 1/2004 | Lipka et al. | 455/112 |
| 2005/0276335 A1 | * | 12/2005 | Kumar | 375/260 |

\* cited by examiner

*Primary Examiner*—Shuwang Liu
*Assistant Examiner*—Dhaval Patel
(74) *Attorney, Agent, or Firm*—Carlos R. Villamar; The Villamar Firm PLLC

(57) ABSTRACT

A crest reduction system and method. The inventive system includes a first circuit for suppressing peak amplitudes of an input signal and providing a peak amplitude suppressed signal in response thereto and a second circuit coupled to the first circuit for rejecting intermodulation distortion in the amplitude suppressed signal. In the illustrative implementation, the first circuit is a peak amplitude suppressor having circuitry for computing an amplitude of the input signal and for computing a gain factor for the input signal in response thereto. In the best mode, the gain factor is obtained from a lookup table. The peak amplitude suppressor further includes a multiplier for applying the gain factor to the input signal. In the illustrative embodiment, the second circuit includes a plurality of bandpass filters and a summer for combining the outputs thereof.

30 Claims, 10 Drawing Sheets

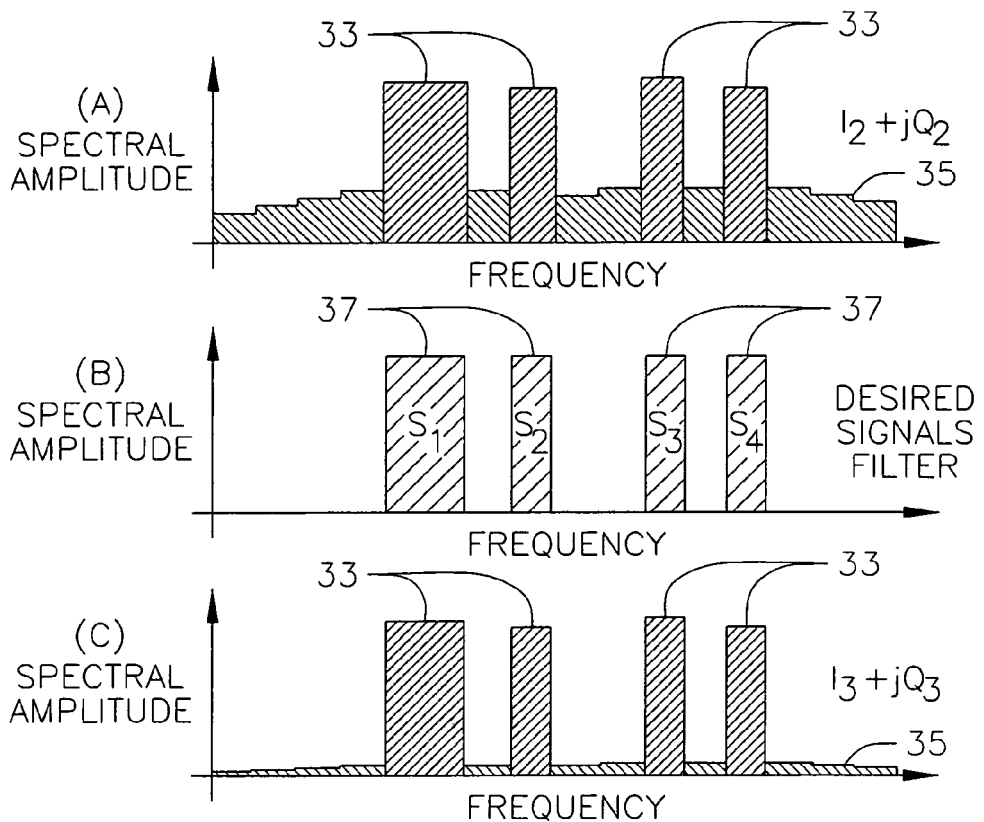
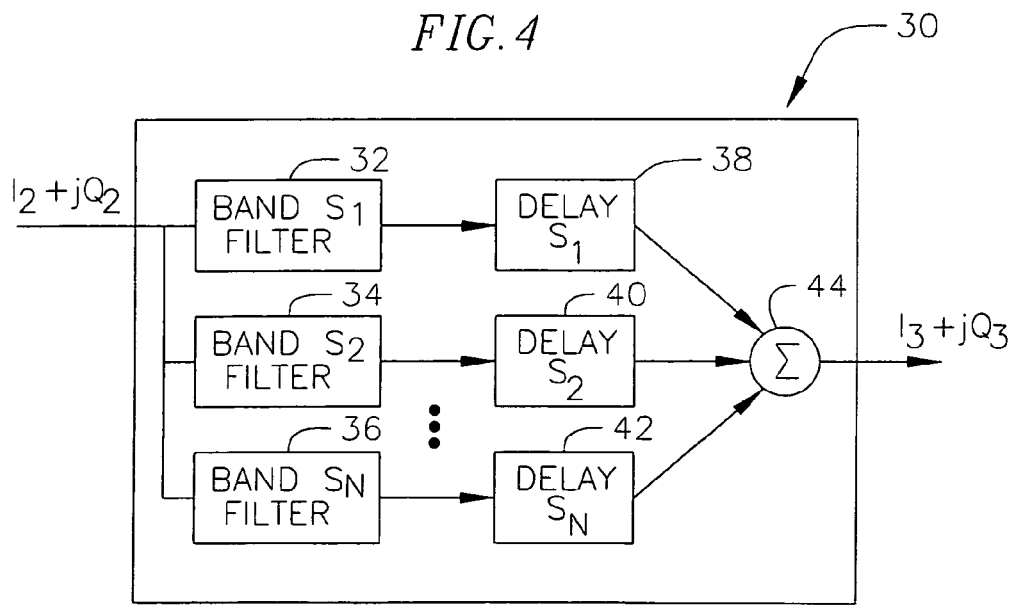

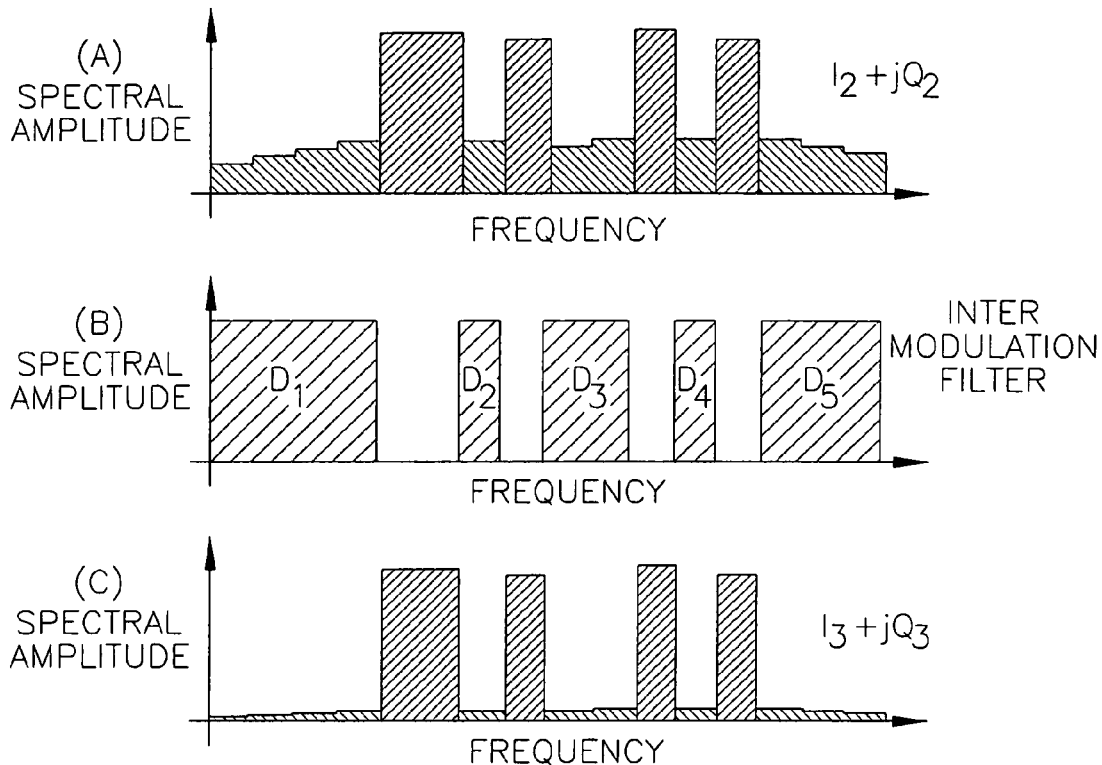
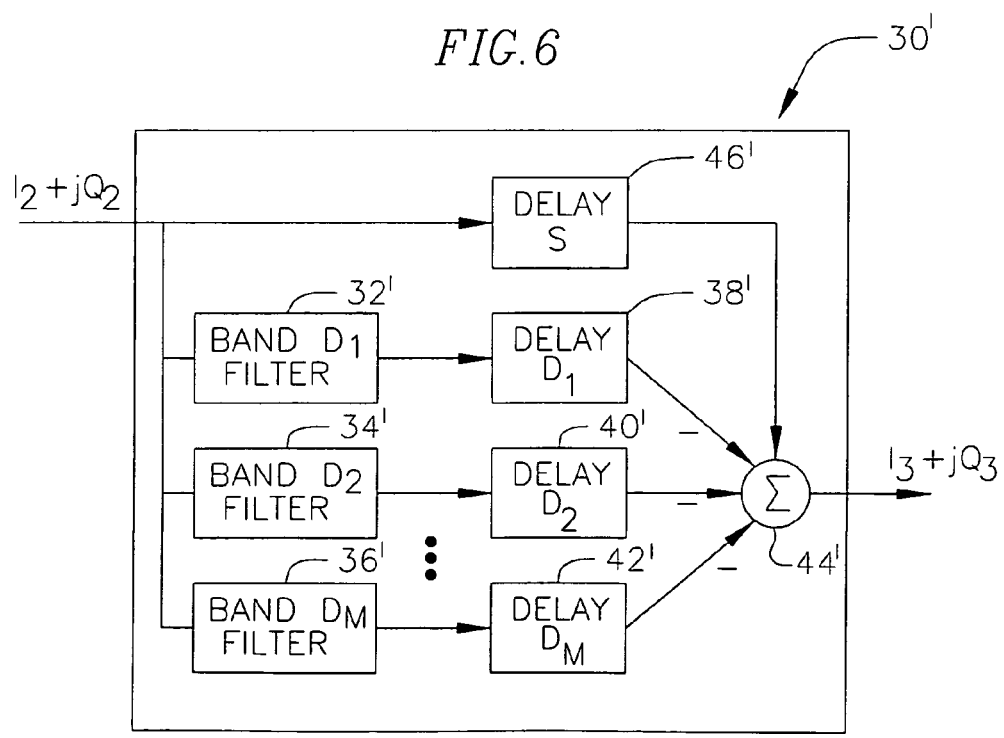

SYSTEM AND METHOD FOR CREST FACTOR REDUCTION

CROSS-REFERENCE TO RELATED APPLICATION

This application claims the benefit of U.S. Provisional Application No. 60/616,716, filed Oct. 7, 2004, the disclosure of which is incorporated herein by reference.

BACKGROUND OF THE INVENTION

1. Field of the Invention

The present invention relates to electrical and electronic circuits and systems. More specifically, the present invention relates to systems and methods for reducing crest factor in electrical and electronic circuits and systems.

2. Description of the Related Art

In Multi-Carrier Power Amplifier (MCPA) communication transmission applications, multiple carriers are typically combined in the baseband, intermediate frequency (IF) or radio frequency (RF) frequency range and the resulting signal is transmitted using a single power amplifier. An objective for MCPA transmission is to transmit a signal at a very high efficiency while maintaining a low Adjacent Channel Power Ratio (ACPR) to meet spectral mask requirements. ACPR is defined as the ratio of power in a bandwidth away from the main signal (the distortion product) to the power in a bandwidth within the main signal. The bandwidths and locations are functions of the standards being employed.

To achieve high efficiency power amplifier (PA) transmission, it is desirable to use semi-non-linear PAs, such as Class A/B PAs. A challenge for MCPA signal transmission is due to the fact that the combined signal has a high crest factor (ratio of peak power to average power), where the peak power is significantly higher than the average power. A small portion of the combined signal can have very high peaks and when transmitted at high PA efficiency, these high-level signals reach into the saturated region of the PA's transfer function and the output of the PA has high intermodulation distortion (IMD). The high IMD level raises the ACPR levels.

To maintain low ACPR without any linearization techniques, the transmit signal level must be decreased sufficiently so that the peak amplitudes are not in the saturated zone of the PA, but this reduces the amplifier efficiency. For example, a four carrier W-CDMA (wideband code division multiple access) signal can have a crest factor exceeding 13 dB. If the crest factor is reduced by about 6 dB, the average power can be increased by 6 dB thus increasing the power efficiency by a factor of 4.

One conventional approach to this problem is to limit the amplitude of either the baseband signal or the RF signal output of each channel using a look-ahead approach. However, it is difficult to generate signals with low crest factor and low ACPR inasmuch as limiting the amplitude increases out of band emissions (e.g. sidelobes) and thereby raises the ACPR level. While, efforts to reduce the ACPR levels generally increase crest factor.

Another prior approach involves the use of unused CDMA codes to reduce the crest factor in the output signals. However, this approach requires knowledge of what is being transmitted so that the unused codes can be identified. This adds to the complexity, storage requirements and cost of the system.

Hence, a need remains in the art for an improved system or method for reducing the crest factor in communications systems while maintaining a low ACPR therefor.

SUMMARY OF THE INVENTION

The need in the art is addressed by the crest reduction system and method of the present invention. In a most general embodiment, the inventive system includes a first circuit for suppressing peak amplitudes of an input signal and providing a peak amplitude suppressed signal in response thereto and a second circuit coupled to the first circuit for rejecting intermodulation distortion in the amplitude suppressed signal.

In the illustrative implementation, the first circuit is a peak amplitude suppressor having circuitry for computing an amplitude of the input signal and for computing a gain factor for the input signal in response thereto. In the best mode, the gain factor is obtained from a lookup table. The peak amplitude suppressor further includes a multiplier for applying the gain factor to the input signal.

In the illustrative embodiment, the second circuit includes a plurality of bandpass filters and a summer for combining the outputs thereof. As an alternative, the second circuit is implemented with a plurality of finite impulse response (FIR) filters. The outputs of the FIR filters are Fast Fourier Transformed and predetermined bands of the output of the FFT are selected and combined to provide a crest factor reduced output signal.

BRIEF DESCRIPTION OF THE DRAWINGS

FIG. 3 is a series of graphs that illustrate the operation of the present invention. FIG. 3(A) shows the typical output of an amplitude suppressor;

FIG. 3(B) shows an illustrative passband of the intermodulation reject filter of FIG. 1;

FIG. 3(C) shows an illustrative output of the intermodulation reject filter of FIG. 1;

FIG. 4 is a simplified block diagram of an illustrative implementation of the IMD reject filter of FIG. 1;

FIG. 5(A) shows the spectrum shape of the input of the alternative embodiment of the IMD reject filter, which contains the desired signals to be transmitted and the IMD components that are generated by the peak amplitude suppressor;

FIG. 5(B) shows signal bands $D_1, D_2, \ldots D_N$ corresponding to IMD signals;

FIG. 5(C) shows the resulting spectrum of the output signal after the output of the amplitude suppressor is passed though the filter of FIG. 6;

FIG. 6 shows an alternative embodiment of the IMD reject filter of FIG. 1;

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
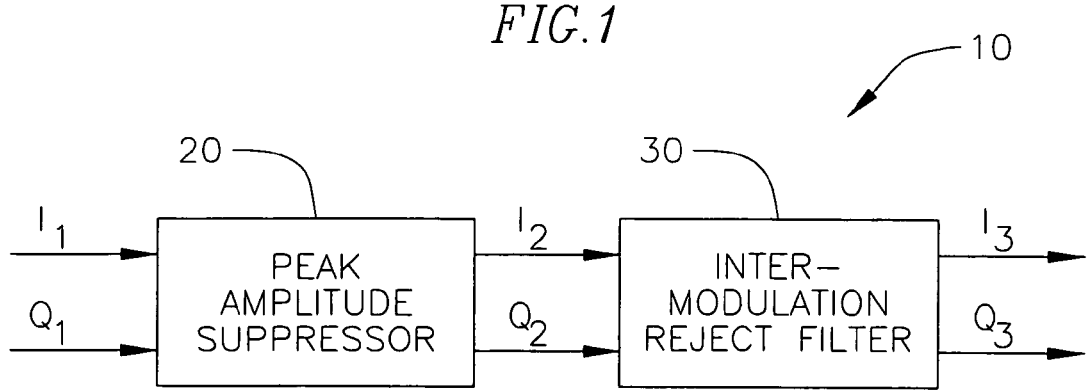
FIG. 1 is a simplified block diagram of an illustrative implementation of a system for crest factor reduction in accordance with the teachings of the present invention.

FIG. 1 is a simplified block diagram of an illustrative implementation of a system for crest factor reduction in accordance with the teachings of the present invention. The system 10 includes a peak amplitude suppressor 20 and an intermodulation rejection filter 30. A baseband, IF or RF input signal may be expressed as:

$$X_1(n) = I_1(n) + jQ_1(n) \quad [1]$$

The signal X(n) is amplitude clipped by the suppressor 20. The phase is maintained to minimize the signal distortion in the following manner:

$$X(n) = X(n); \text{ if } A(n) < T \quad [2]$$

$$X(n) = X(n)T/A(n); \text{ if } A(n) \geq T \quad [3]$$

where $A(n) = |X(n)|$ is the instantaneous amplitude of the signal X(n), and T is the amplitude threshold of the clipping.

Figure 2:
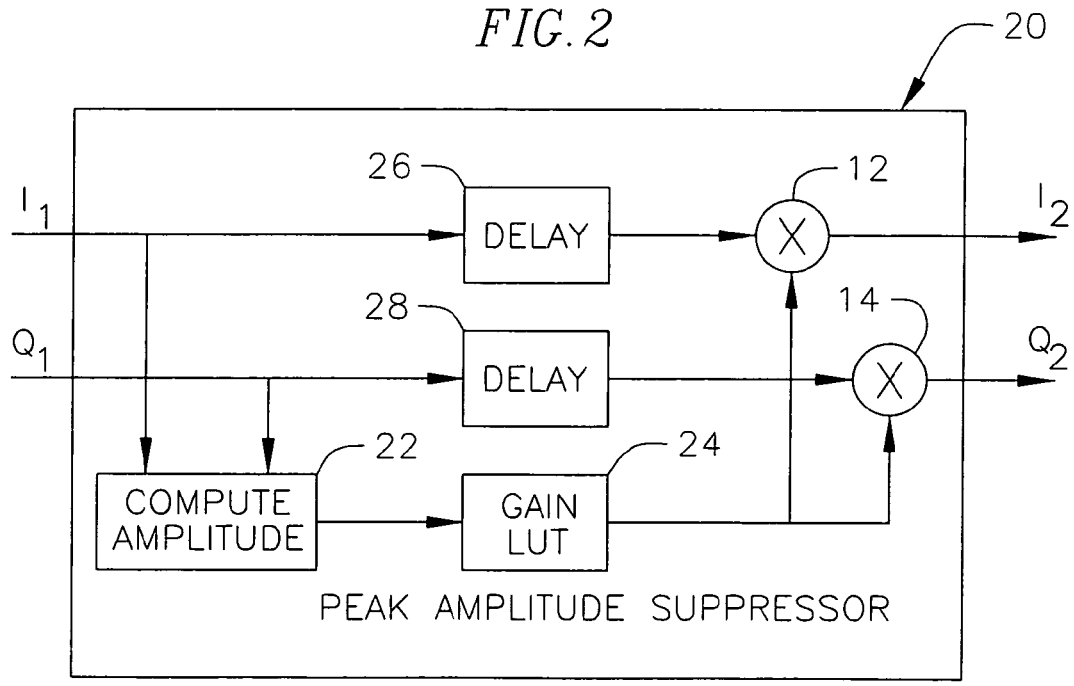
FIG. 2 is a simplified block diagram showing an illustrative implementation of the peak amplitude suppressor of the crest reduction system of the present invention.

FIG. 2 is a simplified block diagram showing an illustrative implementation of the peak amplitude suppressor of the crest reduction system of the present invention. The in-phase and quadrature components of the input are used to compute the amplitude via an amplitude detector 22. In practice, the amplitude detector 22 may be implemented with cordic I/Q to amplitude processing.

The detected amplitude is then fed to a gain factor generator 24. In the best mode, the gain factor generator 24 is implemented with a lookup table (LUT). The LUT 24 stores the T/A(t) gain values. The gain is then applied by first and second multipliers 12 and 14, respectively, to the original signal delayed by first and second delayed elements 26 and 28 respectively. The delay is used to match the delay amount occurring in the amplitude and LUT processing so that the gain is applied to the inputs from which it was computed. This process can be applied at IF or RF where the signal amplitude can be estimated via envelope detection.

After processing by the peak amplitude suppressor 20, the amplitude of the input signal will have a lower crest factor. However, inter-modulation distortion (IMD) is often generated. This is illustrated in FIG. 3.

FIG. 3 is a series of graphs that illustrate the operation of the present invention. FIG. 3(A) shows the typical output of an amplitude suppressor with the desired signals shown at 33 and IMD shown at 35. FIG. 3(B) shows an illustrative passband 37 of the intermodulation reject filter 30 of FIG. 1. FIG. 3(C) shows an illustrative output of the intermodulation reject filter 30 of FIG. 1. To suppress the IMD, the desired signals filter 30 selects the desired signal band or bands and performs signal filtering of these bands only: the desired signal bands are passed while the intermodulation components are attenuated. In this process, the intermodulation products are suppressed with the filter sidelobes, resulting in a high ACPR signal. FIG. 3(A) shows the spectrum shape of the signal input to the Inter-Modulation Reject Filter 30, which contains the desired signals to be transmitted and the IMD components that are generated by the Peak Amplitude Suppressor 20. FIG. 3(B) shows the desired signal bands $S_1, S_2, \ldots, S_N$ corresponding to the desired signal. After passing though a filter with the characteristic shown in FIG. 3(B), an output signal is provided with a spectrum illustrated in FIG. 3(C).

In accordance with the present teachings, at least two approaches can be used to suppress IMD. A first approach, as illustrated in FIG. 4, is to select the desired signal components. A second approach, illustrated in FIGS. 5 and 6 is to reject the undesirable IMD components per se.

FIG. 4 is a simplified block diagram of an illustrative implementation of the IMD reject filter 30 of FIG. 1. In this embodiment, the reject filter 30 consists of plural passband filters, e.g. 32, 34 and 36, followed by a summer 44. Each filter 32, 34 and 36 and its associated delay 38, 40 and 42 can be expressed as a Finite Impulse Response (FIR) filter as follows:

$$S_1 : h_{S1} = \sum_{k=0}^{K1-1} h_{S1,k} z^{-k} \quad [4]$$

$$S_2 : h_{S2} = \sum_{k=0}^{K2-1} h_{S2,k} z^{-k} \quad [5]$$

$$S_N : h_{SN} = \sum_{k=0}^{KN-1} h_{S1,k} z^{-k} \quad [6]$$

The resulting filter is then expressed as $$S_1 + S_2 + \ldots + S_N : h = \sum_{k=0}^{K1-1} h_{S1,k} z^{-k} + \sum_{k=0}^{K2-1} h_{S2,k} z^{-k} + \ldots + \sum_{k=0}^{KN-1} h_{SN,k} z^{-k} \quad [7]$$

which is a single FIR filter. The filter components at each delay can be combined to provide the following filter structure:

$$S_1 + S_2 + \ldots + S_N : \{h\} = \sum_{k=0}^{max(K1-1, K2-1, \ldots, KN-1)} h_k z^{-h} \quad [8]$$

This implies that the reject filter 30 ($S_1 + S_2 + \ldots + S_N$) can be implemented with a single FIR filter.

One way to use this approach is to design a filter for a single carrier, a filter for two adjacent channels, a filter for three adjacent channels, and a filter for four adjacent channels, etc. For a system using equal spaced channel centers, all possible patterns of signals is realizable by frequency shifting and adding this set of filters. In the best mode, the filter coefficients are combined and used as one FIR filter. For two adjacent channels, better performance is achieved when using a filter which is flat across both spectrums as opposed to using two filters designed for a single carrier.

As noted above, the filter of FIG. 4 is based on a desired signals approach. The alternative rejection approach for the filter 30 is illustrated in FIGS. 5 and 6. Similar to the desired signals filter method, the rejection filter 30' performs the filtering of the IMD components and removes the distortion from the original signal.

In this embodiment, to suppress IMD, the filter 30' selects the IMD signal bands and performs signal filtering of these bands only. In this process only the intermodulation products are selected, which are removed from the input signal so that the desired signal is left intact and the IMD is suppressed. FIG. 5(A) shows the spectrum shape of the input of the alternative embodiment of the IMD reject filter, which contains the desired signals to be transmitted and the IMD components that are generated by the peak amplitude suppressor. FIG. 5(B) shows signal bands $D_1, D_2, \ldots D_N$ corresponding to the IMD signals. FIG. 5(C) shows the resulting spectrum of the output signal after the output of the amplitude suppressor 20 is passed though the filter 30' of FIG. 6.

FIG. 6 shows an alternative embodiment of the IMD reject filter of FIG. 1. The rejection filter 30' includes plural filters of which three are shown 32', 34' . . . 36'. Again, in the best mode, the filter coefficients are combined and used as one FIR filter. The filters are designed to pass the IMD in the reject bands $D_1$, $D_2 \ldots D_M$ respectively. The outputs of the filters are delayed by associated delay elements 38', 40' . . . 42' and subtracted from a delayed version of the input signal by a subtractor 44'. The input signal is delayed by element 46'. Those skilled in the art will appreciate that the embodiments of FIGS. 1, 4 and 6 may be implemented in software in which case the components shown are implemented in process steps.

In any event, each filter and its associated delay can be expressed as a Finite Impulse Response (FIR) filter as follows:

$$S_1: h_S = z^{-kS} \quad [9]$$

$$D_1: h_{D1} = \sum_{k=0}^{K1-1} h_{D1,k} z^{-k} \quad [10]$$

$$D_2: h_{D2} = \sum_{k=0}^{K2-1} h_{D2,k} z^{-k} \quad [11]$$

$$D_M: h_{DM} = \sum_{k=0}^{KM-1} h_{D1,k} z^{-k} \quad [12]$$

The resulting filter is then expressed as $$S + D_1 + D_2 + \ldots + D_N: h_{S1} = \quad [13]$$

$$z^{-kS} - \sum_{k=10}^{K1-1} h_{D1,k} z^{-k} - \sum_{k=0}^{K2-1} h_{D2,k} z^{-k} - \ldots - \sum_{k=0}^{KM-1} h_{DM,k} z^{-k}$$

which is a single FIR filter. The filter components at each delay can be combined to provide the following filter structure:

$$S + D_1 + D_2 + \ldots + D_N: \{h\} = \sum_{h=0}^{max(K1-1, K2-1, \ldots, KM-1)} h_k z^{-h} \quad [14]$$

This implies that the reject $(S-D_1-D_2- \ldots -D_M)$ can be implemented with a single FIR filter.

The advantage of this approach is that the filter does not distort the desired signal. Only the intermodulation products are suppressed. Furthermore, because the power of the intermodulation is substantially small compared to the desired signal, the filter does not change the crest factor substantially.

In applications where the signals are equally spaced, a polyphase approach can be used to either select desired signals or reject IMD products.

Figure 7:
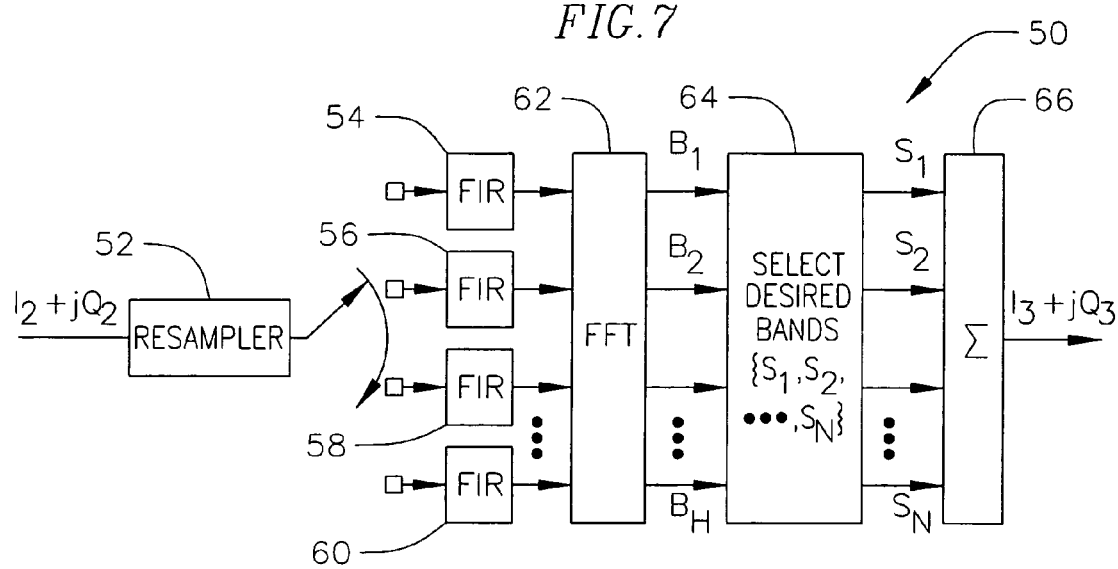
FIG. 7 is a simplified block diagram of an alternative illustrative polyphase implementation of the IMD reject filter in accordance with the present teachings.

FIG. 7 is a simplified block diagram of an alternative illustrative polyphase implementation of the IMD reject filter in accordance with the present teachings. This filter rejects IMD products by selecting desired signals.

Figure 8:
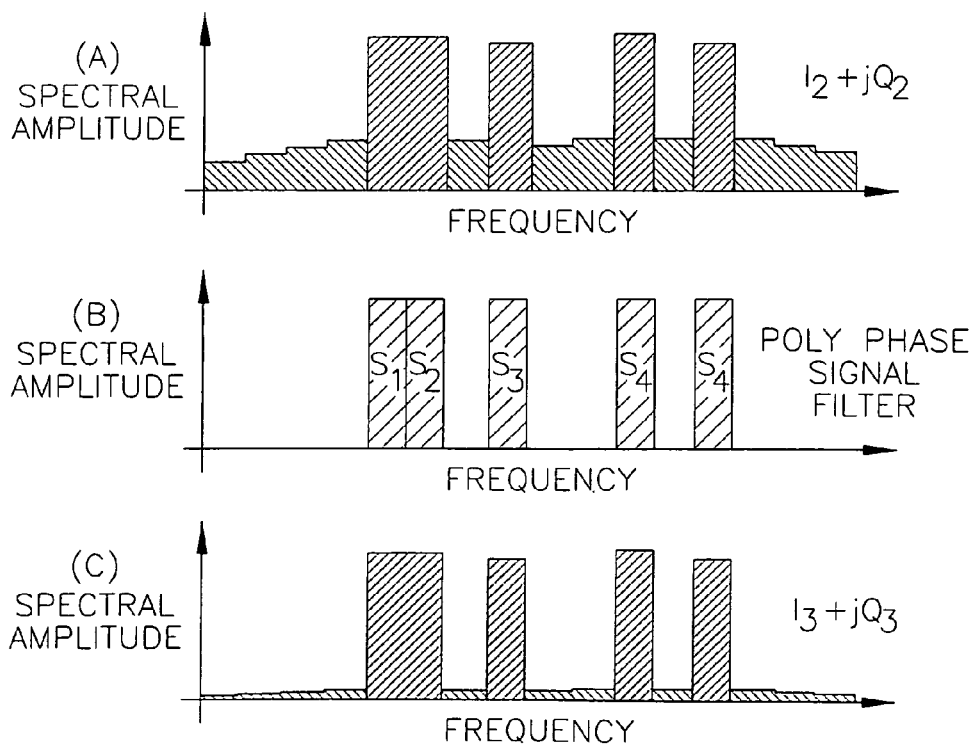
FIG. 8 is a series of graphs designed to illustrate the operation of the filter of FIG. 7.

FIG. 8 is a series of graphs designed to illustrate the operation of the filter 50 of FIG. 7. As per FIGS. 3 and 5 above, the first graph (FIG. 8(A)) shows the input to the filter, the second graph (FIG. 8(B)) shows the characteristic of the filter 50 and the third graph (FIG. 8(C)) shows the output of the filter.

In the implementation of FIG. 7, the output of the peak amplitude suppressor 20 of FIG. 1 is divided into an integer multiple, H, of equal-sized frequency slots by resampler 52 when doing an H-point FFT in the polyphase implementation for $H=2^x$. For H not a power of two, a DFT can be used. The width of these slots is such that only signal energy or IMD energy is present in each slot. Each slot is filtered by a FIR filter 54, 56, 58 and 60 to pass the component in that frequency slot and to reject all other frequency components. Thus, by correctly choosing frequency slots, $B_h$, that contain only signal energy, the signals $S_n$ can be chosen such that the signal $I_3+jQ_3$ contains only signal energy, with the intermodulation components rejected. This selection is effected after a Fast Fourier Transform (via FFT 62) by a filter 64. The selected outputs of the filter 64 are then combined via summer 66.

Figure 9:
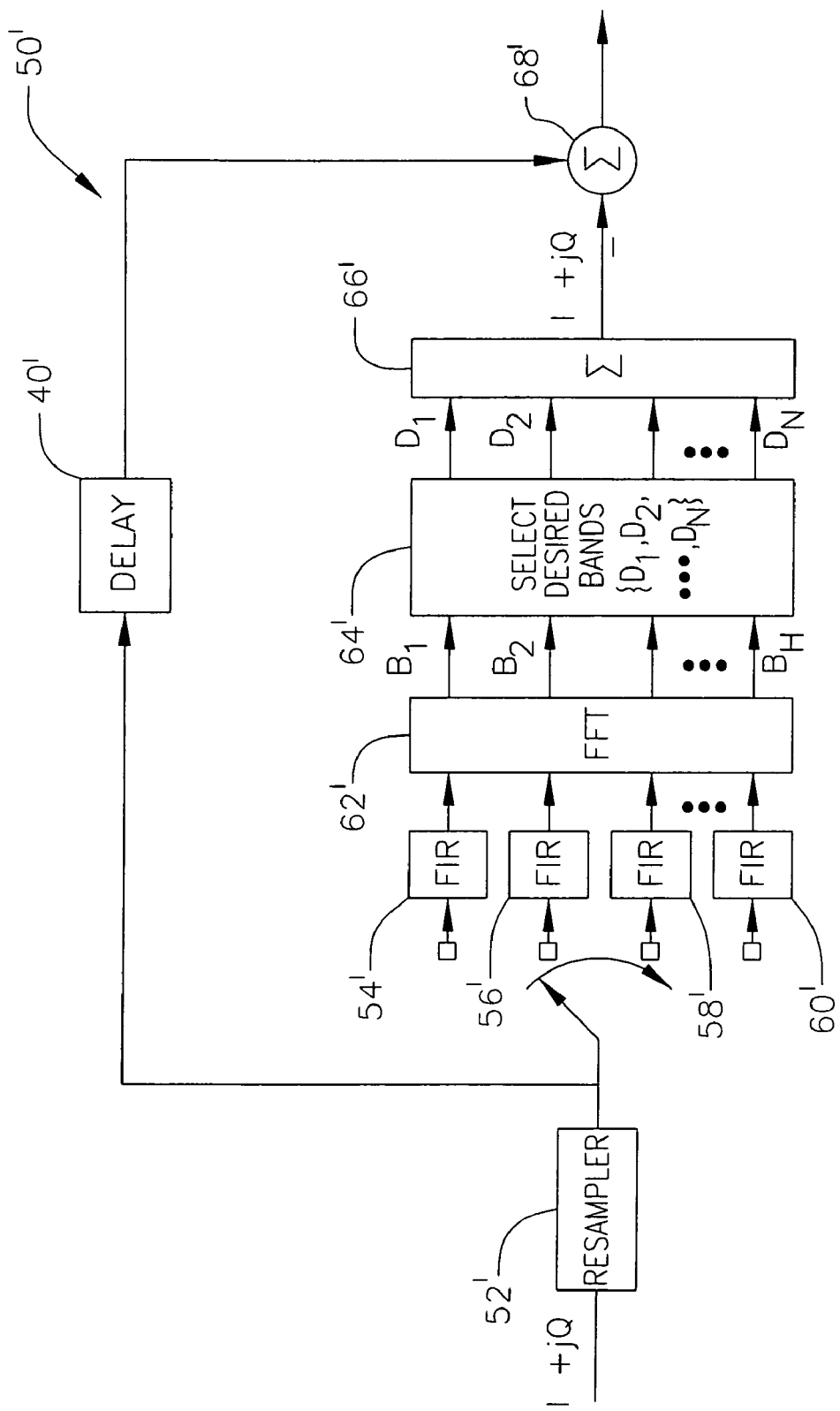
FIG. 9 is a simplified block diagram of an alternative illustrative polyphase implementation of the IMD reject filter in accordance with the present teachings.

FIG. 9 is a simplified block diagram of an alternative illustrative polyphase implementation of the IMD reject filter in accordance with the present teachings. This filter rejects IMD products output by the peak amplitude detector. The embodiment of FIG. 9 is similar to that of FIG. 7 with the exception that the filters are designed to pass the IMD products and the output of the summer 66 is subtracted from a delayed version of the input signal by a subtractor 68'.

Figure 10:
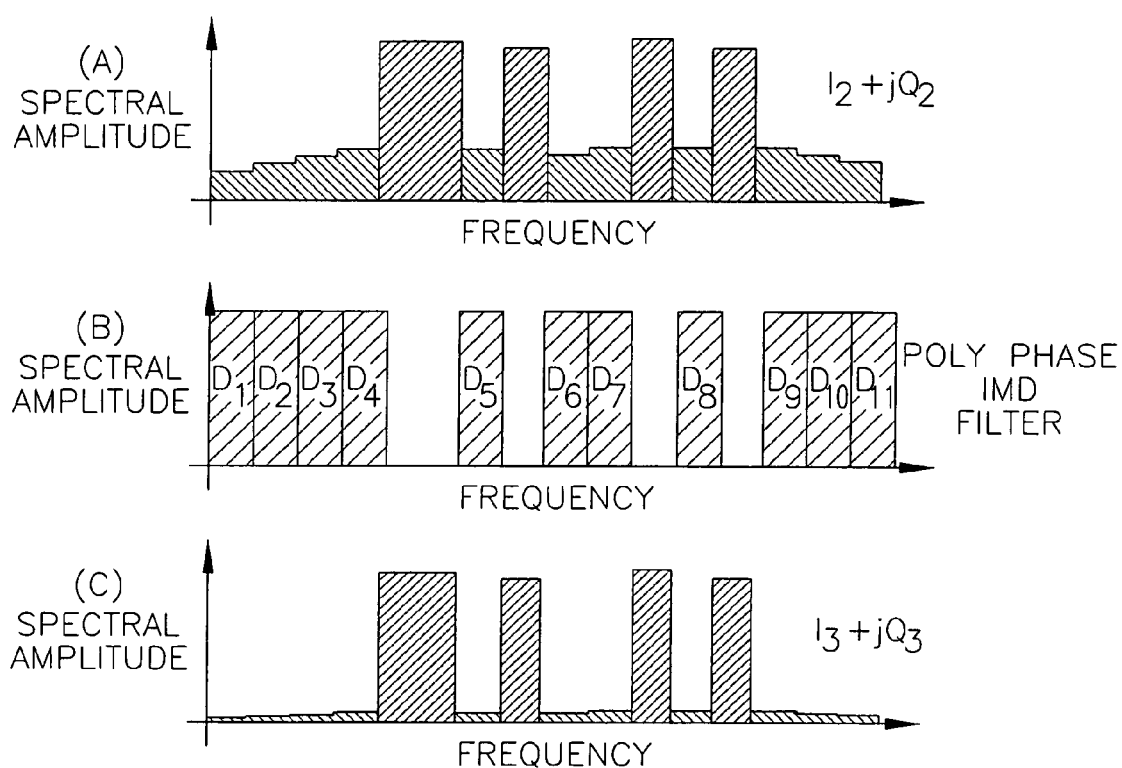
FIG. 10 is a series of graphs designed to illustrate the operation of the filter of FIG. 9.

FIG. 10 is a series of graphs designed to illustrate the operation of the filter 50' of FIG. 9. As per FIGS. 3 and 5, the first graph (FIG. 9(A)) shows the input to the filter, the second graph (FIG. 9(B)) shows the characteristic of the filter 50' and the third graph (FIG. 9(C)) shows the output of the filter.

In the polyphase distortion filter approach of FIG. 9, the spectrum, shown in FIG. 10, of the output of the peak amplitude suppressor is divided into an integer multiple, H, of equal-sized frequency slots. Each slot is filtered to pass the component in that frequency slot and to reject all other frequency components. The width of these slots is such that only signal energy or IMD energy is present in each slot. Thus, by correctly choosing frequency slots, $B_h$, that contain only IMD energy, the intermodulation distortion components, $D_n$, of FIG. 9 can be chosen such that the signal $I_3+jQ_3$ contains only distortion energy, with the desired signal components rejected. The final output of the filter 52' is the difference between the input signal $I_2+jQ_2$, properly delayed, and the sum of signals, $D_n$. This signal contains only signal energy with the distortion removed.

A multibands and arbitrary shape filter can be implemented in passbands mode where the desired bands are selected and the undesired bands such as intermodulation distortion (IMD) bands are removed.

Figure 11:
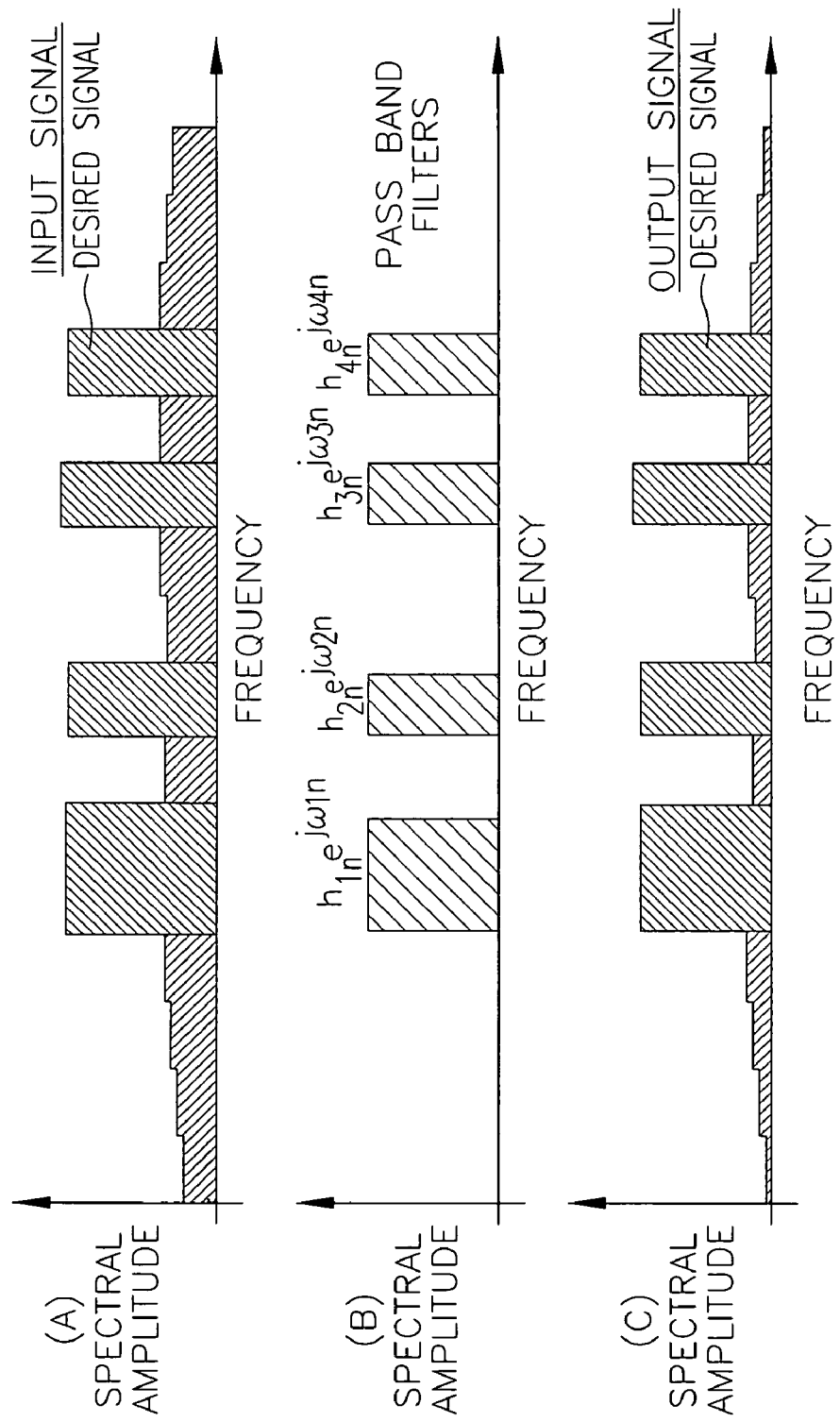
FIG. 11 illustrates passbands filtering in accordance with the present teachings.

FIG. 11 illustrates passbands filtering in accordance with the present teachings. The objective is to select the desired signal by forming the combined filtering of these desired signals. FIG. 11(A) shows the input signal; FIG. 11(B) shows the spectral characteristic of a passband filter; and FIG. 11(C) shows the output filtered signal.

The transmit signal can be a combination of multiple carriers at arbitrary frequencies, and thus the spectrum can be asymmetric. In these applications multiple bandpass filters can be designed, follow by a filter combination process to realize the combined filter with a single filter. Let $I_i(n)+jQ_i(n)$ be the input signal of the filter. The output of the filter can be expressed as $$I_o(n)+jQ_o(n)=\{I_i(n)+jQ_i(n)\}*g(n) \qquad [15]$$

where g(n) is the composite filter. We can expand g(n) and rewrite the equation as $$\begin{aligned}I_o(n) + jQ_o(n) &= \\ \{I_i(n) &+ jQ_i(n)\}*\{h_1(n)\cdot e^{j\omega_1 n}+h_2(n)\cdot e^{j\omega_2 n}+\ldots+h_N(n)\cdot e^{j\omega_N n}\}\end{aligned} \qquad [16]$$

$$\begin{aligned}= \{I_i(n) + jQ_i(n)\}* \\ \{h_1(n)\cdot\cos\omega_1 n + h_2(n)\cdot\cos\omega_1 n + \ldots + h_N(n)\cdot\cos\omega_N n + \\ j[h_1(n)\cdot\sin\omega_1 n + h_2(n)\cdot\sin\omega_1 n + \ldots + h_N(n)\cdot\sin\omega_N n]\}\end{aligned} \qquad [17]$$

where * indicates the convolution process, $$x(n)*y(n) = \sum_{k=0}^{N-1} x(k)y(n-k). \qquad [18]$$

In the above equation, $h_i(n)$ is the low pass version of the desired filter and $\omega_i$ is the angular frequency of the desired signal. The filters $h_i(n)$ can have different spectral shapes.

Thus:

$$I_o(n) + jQ_o(n) = \{I_i(n) + jQ_i(n)\}*g(n) \qquad [19]$$

$$= \{I_i(n)*g_c(n) - Q_i(n)*g_s(n)\} + j\{I_i(n)*g_s(n) + Q_i(n)*g_c(n)\} \qquad [20]$$

where:

$$g(n) = g_c(n) + jg_s(n) \qquad [21]$$

Thus:

$$g_c(n)=h_1(n)\cdot\cos\omega_1 n+h_2(n)\cdot\cos\omega_1 n+\ldots+h_N(n)\cdot\cos\omega_N n \qquad [22]$$

$$g_s(n)=h_1(n)\cdot\sin\omega_1 n+h_2(n)\cdot\sin\omega_1 n+\ldots+h_N(n)\cdot\sin\omega_N n \qquad [23]$$

The process is to compute the filter shape $h_i(n)$, shift it to the desired frequency $\omega_i$, and then combine each in the above fashion to form the single complex filter g(n).

The IMD reject filter can be implemented in notchband mode where the undesired bands (IMD bands) are selected, and the desired bands removed. The resulting filtered signal is then removed from the transmit signal to produce the desired signal that is free from the IMD signals.

Figure 12:
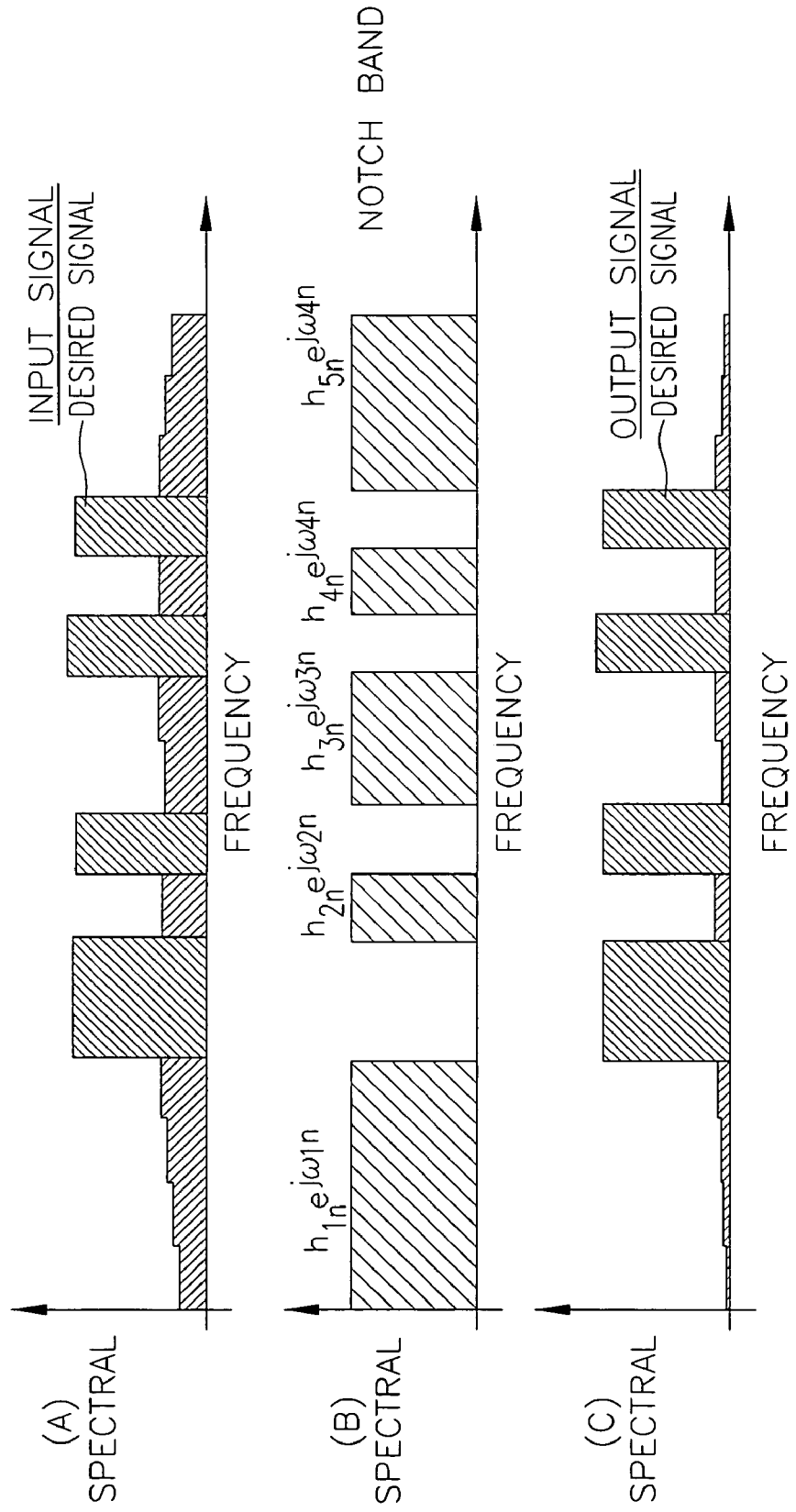
FIG. 12 illustrates notchbands filtering in accordance with the present teachings.

FIG. 12 illustrates notchbands filtering in accordance with the present teachings. The objective is to remove undesired signal components by isolating the undesired components with filters and then removing those components from the original signal. FIG. 12(A) shows the input signal; FIG. 12(B) shows the spectral characteristic of a notch filter; and FIG. 12(C) shows the output-filtered signal.

The transmitted signal can be a combination of multiple carriers at arbitrary frequency locations, and thus the spectrum can be asymmetric. In these applications multiple undesired-band filters can be designed, followed by a filter combination process to realize the combined filter with a single filter. Let $I_i(t)+jQ_i(t)$ be the input signal of the filter. The output of the filter can be expressed as $$\begin{aligned}I_o(n)+jQ_o(n)=\{I_i(n)+jQ_i(n)\}*h_{passthru}(n)-\{I_i(n)+jQ_i(n)\}*[h_1(n)\cdot e^{j\omega_1 n}+h_2(n)\cdot e^{j\omega_2 n}+\ldots+h_N(n)\cdot e^{j\omega_N n}]\end{aligned} \qquad [24]$$

If we write $$I_o(n)+jQ_o(n)=\{I_i(n)+jQ_i(n)\}*g(n) \qquad [25]$$

then:

$$g(n)=\{\delta_k(n-(N_{taps}+1)/2)-[h_1(n)\cdot e^{j\omega_1 n}+h_2(n)\cdot e^{j\omega_2 n}+\ldots+h_N(n)\cdot e^{j\omega_N n}]\} \qquad [26]$$

where $\delta_k(n-(N_{taps}+1)/2)$ is the Kronecker delta function with a delay $(N_{taps}+1)/2$ which represents the group delay of the odd filter tap length $N_{taps}$ of the h's. This length will be the same for all h's.

Expanding, $$g(n)=\{\delta_k(n-(N_{taps}+1)/2)-[h_1(n)\cdot\cos\omega_1 n+h_2(n)\cdot\cos\omega_2 n+\ldots+h_N(n)\cdot\cos\omega_N n]-j[h_1(n)\cdot\sin\omega_1 n+h_2(n)\cdot\sin\omega_2 n+\ldots+h_N(n)\cdot\sin\omega_N n]\} \qquad [27]$$

and $$\begin{aligned}I_o(n)+jQ_o(n)=\{I_i(n)*[\delta_k(n-(N_{taps}+1)/2)-[h_1(n)\cdot\cos\omega_1 n+h_2(n)\cdot\cos\omega_2 n+\ldots+h_N(n)\cdot\cos\omega_N n]]+Q_i(n)\\*[h_1(n)\cdot\sin\omega_1 n+h_2(n)\cdot\sin\omega_2 n+\ldots+h_N(n)\cdot\sin\omega_N n]-j\{I_i(n)*[h_1(n)\cdot\sin\omega_1 n+h_2(n)\cdot\sin\omega_2 n+\ldots+h_N(n)\cdot\sin\omega_N n]-Q_i(n)*[\delta_k(n-(N_{taps}+1)/2)-[h_1(n)\cdot\cos\omega_1 n+h_2(n)\cdot\cos\omega_2 n+\ldots+h_N(n)\cdot\cos\omega_N n]]\}\end{aligned} \qquad [28]$$

where $h_i(n)$ is the lowpass version of the $i^{th}$ undesired-band filter, and $\omega_i$ is the angular frequency of the undesired signal. The filters $h_i(n)$ can have different spectral shapes.

Thus:

$$I_o(n) + jQ_o(n) = \{I_i(n) + jQ_i(n)\}*g(n) \qquad [29]$$

$$= \{I_i(n)*g_c(n) - Q_i(n)*g_s(n)\} + j\{I_i(n)*g_s(n) + Q_i(n)*g_c(n)\} \qquad [30]$$

where:

$$g(n) = g_c(n) + jg_s(n) \qquad [31]$$

Thus $$g_c(n)=\delta_k(n-(N_{taps}+1)//2)-[h_1(n)\cdot\cos\omega_1 n+h_2(n)\cdot\cos\omega_1 n+\ldots+h_N(n)\cdot\cos\omega_N n] \qquad [32]$$

$$g_s(n)=-[h_1(n)\cdot\sin\omega_1 n+h_2(n)\cdot\sin\omega_1 n+\ldots+h_N(n)\cdot\sin\omega_N n] \qquad [33]$$

The process is to compute the filter shape $h_i(n)$, shift to the desired frequency $\omega_i$, and then combine each in the above fashion to form the single complex FIR, g(n).

To design a combination FIR, a passband filtering approach or notch filtering approach may be used. An illustrative passband filtering approach is as follows:

(1) Determine the number of passband filters, M, based on the desired spectral shape,
(2) Design the baseband version of the filters. Each filter will require $N_m$ taps, m=1:M,
(3) Select the largest number of taps, i.e., $N_{max}$=Max($N_1$, $N_2$, $N_3$, ... $N_M$),
(4) Redesign the filters with maximum number of taps, to obtain the coefficients $\{h_m(n)\}$ where m=1:M, n=0:$N_{max}$−1. Since the filters are at baseband, the coefficients are symmetric.
(5) Translate the baseband filter into an WF filter by frequency shifting. That is:

$$\{w_m(n)\}=\{h_m(n)e^{j*2*pi*fm \cdot n}\}, m=1:M \quad [34]$$

(6) Combine the coefficients of $\{w_m(n)\}$ to form the combine filter coefficients:

$$\{g(n)\} = \sum_{m=1}^{M} w_m(n), n = 0:N - 1. \quad [35]$$

This filter selects the passband of the desired signal. In matrix form, the filter weights are computed as:

$$[g(0)\ g(1) ... g(N-1)] = [k_1\ k_2\ ...k_M] \quad [36]$$

$$\begin{bmatrix} w_1(0) & w_1(1) & ... & w_1(N-1) \\ w_2(0) & w_2(1) & ... & w_2(N-1) \\ ... & ... & ... & ... \\ w_M(0) & w_M(1) & ... & w_M(N-1) \end{bmatrix}$$

where $k_p$ is the weight associated with $p^{th}$ filter, and $w_p$(0:N−1) are the coefficients of the $p^{th}$ filter.

(7) Build a single complex FIR with $N_{max}$ taps.

For the notch filtering approach, the process is as follows:
(1) Determine the number of notch filters, M, based on the desired spectral shape,
(2) Design the baseband version of the notch filters, each filter will require $N_m$ taps, m=1:M,
(3) Select the largest number of taps, i.e., $N_{max}$=Max($N_1$, $N_2$, $N_3$, ... $N_M$), such as $N_{max}$ is odd.
(4) Redesign the filters with maximum number of taps, to obtain the coefficients $\{h_m(n)\}$ where m=1:M, n=0:N−1. Since the filters are at baseband, the coefficients are symmetric.
(5) Translate the baseband filter into IF filter by frequency shifting, that is $$\{w_m(n)\}=\{h_m(n)e^{j*2*pi*fm \cdot n}\}, m=1:M. \quad [37]$$

(6) Combine the coefficient of $\{w_n(m)\}$ to form the combine filter coefficients:

$$\{g(n)\} = \delta_k(n - (N_{max} + 1)/2) - \sum_{m=1}^{M} k_m w_m(n), n = 0:N - 1. \quad [38]$$

This filter removes the notch bands from the original signal. Notes that $z^{-(Nmax+1)/2}$ represents the delay of the original signal. In matrix form, the filter weight is computed as:

$$[g(0)\ g(1)\ ...\ g(N-1)] = [1\ -k_1\ ...\ -k_M] \quad [39]$$

$$\begin{bmatrix} 0 & 0 & 1 & 0 & 0 \\ w_1(0) & w_1(1) & w_1\left(\frac{N+1}{2}\right) & ... & w_1(N-1) \\ ... & ... & ... & ... & ... \\ w_M(0) & w_M(1) & w_M\left(\frac{N+1}{2}\right) & ... & w_M(N-1) \end{bmatrix}$$

where $k_p$ is the weight associated with $p^{th}$ filter, and $w_p$(0:N−1) are the coefficients of the $p^{th}$ filter.

(7) Build a single complex FIR with $N_{max}$ taps.

Figure 13:
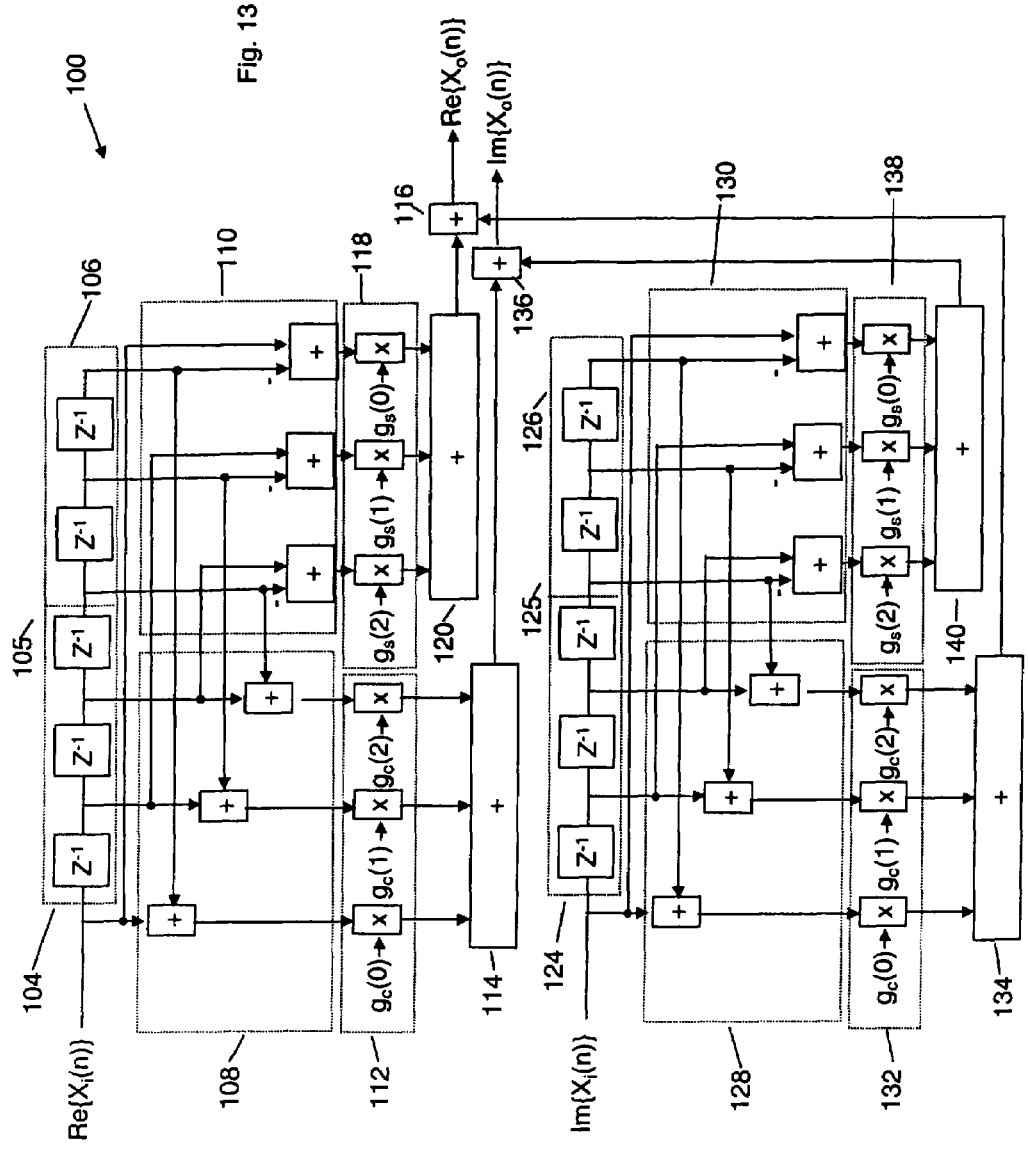
FIG. 13 is an illustrative implementation of a single Multi bands and Arbitrary Shape Filter that support multiple bandpass signals for even length filter.

The Multi bands and Arbitrary Shape Filter structure is as shown in FIG. 13. The input signal $I_i(n)+jQ_i(n)$ passes through a tap delay line of length N ($=N_{max}$), selected to support the filter $h_i(n)$ spectral requirements.

By careful manipulation of the following equation, the coefficients, $g_c(n)$ and $g_s(n)$ can be forced to be symmetric and anti-symmetric. In the equation, $$I_o(n)+jQ_o(n)=\{I_i(n)+jQ_i(n)\}*\{h_1(n) \cdot e^{j\omega 1n}+h_2(n) \cdot e^{j\omega 2n}+...+h_N(n) \cdot e^{j\omega Nn}\}$$

we can write each of the modulated filter coefficient terms as $$w_m(n)=h_m(n) \cdot e^{j\omega_m n}=h_m(0)e^{j\omega_m 0}, h_m(1)e^{j\omega_m 1}, h_m(2)e^{j\omega_m 2}, ... h_m(N-1)e^{j\omega_m(N-1)}$$

$$w_m(n)=e^{j\omega_m(N-1)/2}(h_m(0)e^{-j\omega_m(N-1)/2}, h_m(1)e^{j\omega_m(1-(N-1)/2)}, h_m(2)e^{j\omega_m(2-(N-1)/2)}, ..., h_m(N-1)e^{j\omega_m(N-1)/2})$$

Since the constant phase does not effect the filtering of the signal, we can remove it. For ease of notation, we continue to use the same variable with the constant phase removed.

$$w_m(n)=h_m(0)e^{-j\omega_m(N-1)/2}, h_m(1)e^{j\omega_m(1-(N-1)/2)}, h_m(2)e^{j\omega_m(2-(N-1)/2)}, ..., h_m(N-1)e^{j\omega_m(N-1)/2})$$

The real part of the $m^{th}$ set of weights is $$Re(w_m(n))=(h_m(0)\cos(-w_m(N-1)/2), h_m(1)\cos(-w_m((N-1)/2)-1), ..., h_m(N-2)\cos(w_m((N-1)/2)-1), h_m(N-1)\cos(w_m(N-1)/2)$$

The imaginary part of the mth set of weights is $$Im(w_m(n))=(h_m(0)\sin(-w_m(N-1)/2), h_m(1)\sin(-w_m((N-1)/2)-1), ..., h_m(N-2)\sin(w_m((N-1)/2)-1), h_m(N-1)\sin(w_m(N-1)/2)$$

Note that the real part of $w_m(n)$ is symmetric since corresponding taps are $h_m(p)\cos(-w_m((N-1)/2-p))$ and $h_m(N-1-p)\cos(w_m((N-1)/2-p))$, $h_m(n)$ is symmetric (baseband filter), and $\cos(-u)=\cos(u)$. Note that the imaginary part of $w_m(n)$ is anti-symmetric since corresponding taps are $h_m(p)\sin(-w_m((N-1)/2-p))$ and $h_m(N-1-p)\sin(w_m((N-1)/2-p))$ and $\sin(-u)=-\sin(u)$.

The sum of all of the weights, g(n), shares all of the symmetry properties of its component filter weights since they are all the same size and addition does not change symmetry properties if all of the terms have the same symmetry property. Thus, $$g_c(n)=Re(g(n))=g_c(0), g_c(1), g_c(N-2), g_c(N-1)$$

where $g_c(p)=g_c(N-1-p)$ $$g_s(n)=Im(g(n))=g_s(0),g_s(1),\ldots,g_s(N-2),g_s(N-1)$$

where $g_s(p)=-g_s(N-1-p)$

By using the usual technique of presuming for symmetric filters, we find that the output can be written as $$X_o(n) = x_i(n) * g(n) = \sum_{k=0}^{N-1} X_i(n-k)g(k)$$

$$X_o(n) = \sum_{k=0}^{N-1} \text{Re}(X_i(n-k))\text{Re}(g(k)) - \text{Im}(X_i(n-k))\text{Im}(g(k)) +$$
$$j(\text{Re}(X_i(n-k))\text{Im}(g(k)) + \text{Im}(X_i(n-k))\text{Re}(g(k)))$$

$$X_o(n) = \sum_{k=0}^{N-1} \text{Re}(X_i(n-k))g_c(k) - \text{Im}(X_i(n-k))g_s(k) +$$
$$j(\text{Re}(X_i(n-k))g_s(k) + \text{Im}(X_i(n-k))g_c(k))$$

For even $N$, $$X_o(n) = \sum_{k=0}^{(N-2)/2} (\text{Re}(X_i(n-k)) + \text{Re}(X_i(N-1-(n-k))))g_c(k) -$$
$$(\text{Im}(X_i(n-k)) - \text{Im}(X_i(N-1-(n-k))))g_s(k) +$$
$$j(\text{Re}(X_i(n-k)) + \text{Re}(X_i(N-1-(n-k))))g_s(k) +$$
$$\text{Im}(X_i(n-k)) - \text{Im}(X_i(N-1-(n-k))))g_c(k)$$

Grouping the terms alone leads to $$X_o(n) = \sum_{k=0}^{(N-2)/2} (\text{Re}(X_i(n-k)) + \text{Re}(X_i(N-1-(n-k))))g_c(k) -$$
$$\sum_{k=0}^{(N-2)/2} (\text{Im}(X_i(n-k)) - \text{Im}(X_i(N-1-(n-k))))g_s(k) +$$
$$j\Big\{\sum_{k=0}^{(N-2)/2} (\text{Re}(X_i(n-k)) + \text{Re}(X_i(N-1-(n-k))))g_s(k) +$$
$$\sum_{k=0}^{(N-2)/2} \text{Im}(X_i(n-k)) - \text{Im}(X_i(N-1-(n-k))))g_c(k)\Big\}$$

Thus, the implementation is to presume the symmetric taps at the adders as shown in FIG. 13 thus saving multipliers. The taps which will be multiplied by the imaginary weights are subtracted while the taps multiplied by the real weights are added. FIG. 13 is a conceptual drawing showing a symmetric and asymmetric FIR filter implementation where presuming is performed followed by multiplication by a coefficient followed by a summing of all of the products. In actual implementation, each coefficient multiply occurs at the same time and the outputs are all added. This is the same as in any FIR filter implementation.

Note that symmetry is exploited, reducing the number of multiplications required by a factor of one-half.

For odd N, grouping the terms and properly dealing with the center taps leads to $$X_o(n) = \Big\{\sum_{k=0}^{(N-3)/2} (\text{Re}(X_i(n-k)) + \text{Re}(X_i(N-1-(n-k))))g_c(k)\Big\} +$$
$$\text{Re}(X_i(n-(N-1)/2))g_c((N-1)/2) -$$
$$\Big[\Big\{\sum_{k=0}^{(N-3)/2} (\text{Im}(X_i(n-k)) - \text{Im}(X_i(N-1-(n-k))))g_s(k)\Big\} +$$
$$\text{Im}(X_i(n-(N-1)/2))g_s((N-1)/2] +$$
$$j\Big[\Big\{\sum_{k=0}^{(N-3)/2} (\text{Re}(X_i(n-k)) + \text{Re}(X_i(N-1-(n-k))))g_s(k)\Big\} +$$
$$j(\text{Re}(X_i(n-(N-1)/2))g_s((N-1)/2) +$$
$$\Big\{\sum_{k=0}^{(N-3)/2} \text{Im}(X_i(n-k)) - \text{Im}(X_i(N-1-(-n-k))))g_c(k)\Big\} -$$
$$\text{Im}(X_i(n-(N-1)/2))g_c((N-1)/2))\Big]$$

Figure 14:
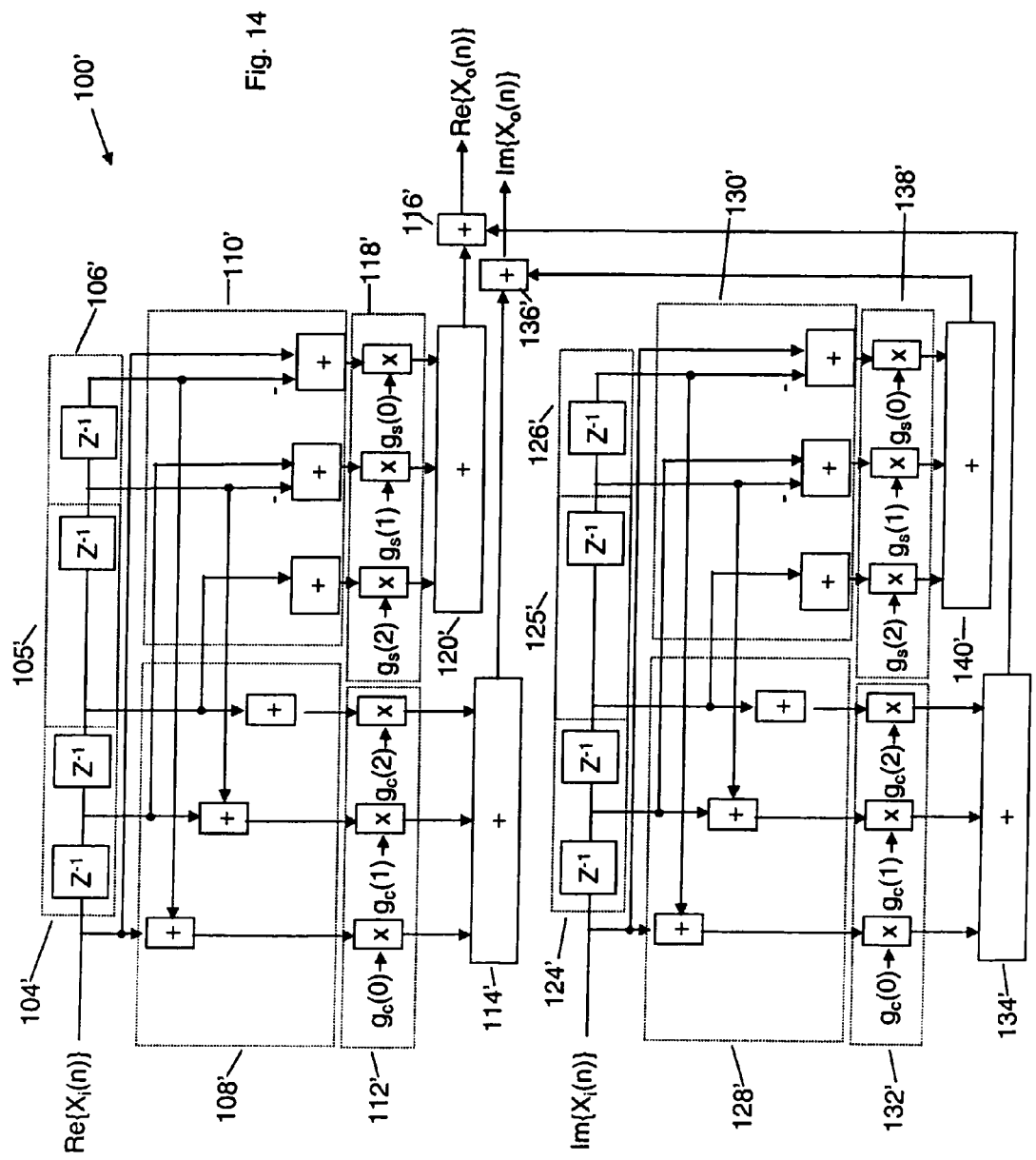
FIG. 14 is an illustrative implementation of a single Multi bands and Arbitrary Shape Filter that support multiple bandpass signals for odd length filter.

FIG. 14 shows this implementation. Again this is a conceptual drawing showing a symmetric FIR filter implementation where presuming is performed followed by multiplication by a coefficient followed by a summing of all of the products. In the case of odd length filter coefficients, the center tap is not pre-summed and is instead simply directly multiplied by its coefficient.

FIG. 13 is an illustrative implementation of a single Multi bands and Arbitrary Shape Filter that support multiple bandpass signals for even length filter.

FIG. 14 is an illustrative implementation of a single Multi bands and Arbitrary Shape Filter that support multiple bandpass signals for odd length filter.

The devices and subsystems of the exemplary embodiments of FIGS. 1-14 can include computer readable medium or memories for holding instructions programmed according to the teachings of the present invention and for holding data structures, tables, records, and/or other data described herein. Computer readable medium can include any suitable medium that participates in providing instructions to a processor for execution. Such a medium can take many forms, including but not limited to, non-volatile media, volatile media, etc. Non-volatile media can include, for example, optical or magnetic disks, magneto-optical disks, and the like. Volatile media can include dynamic memories, and the like. Transmission media can include coaxial cables, copper wire, fiber optics, and the like. Common forms of computer-readable media can include, for example, a floppy disk, a flexible disk, hard disk, magnetic tape, any other suitable magnetic medium, a CD-ROM, CDRW, DVD, any other suitable optical medium, a RAM, a PROM, an EPROM, a FLASH-EPROM, any other suitable memory chip or cartridge, or any other suitable medium from which a computer can read.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A crest factor reduction system, the system comprising:
a peak amplitude suppressor for suppressing peak amplitudes of an input signal X(n) relative to an average value of the input signal and providing a peak amplitude suppressed signal with a reduced peak-to-average ratio (PAR) in response thereto;
said peak amplitude suppressor works on the input signal X(n), on a sample by sample basis, according to the following equation:

$X(n)=X(n)$ if $A(n)<T$ $X(n)=X(n)\cdot T/A(n)$ if $A(n) \geq T$ where A(n) is an approximation of an amplitude of an nth sample of said input signal X(n) or A(n) is an amplitude of an nth sample of said input signal X(n) given by $A(n)=\sqrt{real(X(n))^2+imag(X(n))^2}$, T is a clipping threshold of the peak amplitude suppressor, and T/A(n) is a gain factor of the nth sample of X(n); and
an intermodulation reject filter coupled to said peak amplitude suppressor for rejecting intermodulation distortion in said amplitude suppressed signal, said intermodulation reject filter's output being a peak suppressed version of said input signal,
wherein said intermodulation reject filter is a single filter whose coefficients are derived from frequency shifting and adding coefficients of a baseband-designed filter for a single carrier, a baseband-designed filter for two adjacent carriers, a baseband-designed filter for three adjacent carriers, up to a baseband-designed filter for M adjacent carriers where a largest filter of the adjacent carriers is used wherever the adjacent carriers are present and each of the carriers falls in a passband of exactly one of the frequency-shifted baseband-designed filters.

2. The system of claim 1, wherein said intermodulation reject filter includes bandpass filters implemented by employing real and imaginary inputs according to the following equation for an even number of taps, N, $$X_o(n) = \sum_{k=0}^{(N-2)/2} (Re(X_i(n-k)) + Re(X_i(N-1-(-n-k))))g_c(k) -$$

$$\sum_{k=0}^{(N-2)/2} (Im(X_i(n-k)) - Im(X_i(N-1-(-n-k))))g_s(k) +$$

$$j\left\{\sum_{k=0}^{(N-2)/2} (Re(X_i(n-k)) + Re(X_i(N-1-(-n-k))))g_s(k) +\right.$$

$$\left.\sum_{k=0}^{(N-2)/2} Im(X_i(n-k)) - Im(X_i(N-1-(-n-k)))\bigg]g_c(k)\right\},$$

and for an odd number of taps, N, $$X_o(n) = \left\{\sum_{k=0}^{(N-3)/2} (Re(X_i(n-k)) + Re(X_i(N-1-(-n-k))))g_c(k)\right\} +$$

$$Re(X_i(n-(N-1)/2))g_c((N-1)/2) -$$

$$\left[\left\{\sum_{k=0}^{(N-3)/2} (Im(X_i(n-k)) - Im(X_i(N-1-(-n-k))))g_s(k)\right\} +\right.$$

$$Im(X_i(n-(N-1)/2))g_s((N-1)/2)\bigg] +$$

$$j\left[\left\{\sum_{k=0}^{(N-3)/2} (Re(X_i(n-k)) + Re(X_i(N-1-(-n-k))))g_s(k)\right\} +\right.$$

$$j\bigg(Re(X_i(n-(N-1)/2))g_s((N-1)/2) +$$

$$\left\{\sum_{k=0}^{(N-3)/2} Im(X_i(n-k)) - Im(X_i(N-1-(-n-k)))\bigg]g_c(k)\right\} -$$

$$Im(X_i(n-(N-1)/2))g_c((N-1)/2)\bigg)\bigg]$$

where $X_i(n)$ is the input signal, $$\{g(n)\} = \sum_{m=1}^{M} w_m(n), n = 0:N-1,$$

$$\{w_m(n)\} = \{h_m(n)e^{j*2*pi*fm\cdot n}\}, m = 1:M$$

$h_m(n)$ are symmetric baseband filters, one per carrier of said input signal,
$g_c(n)$ is a real part of g(n), real(g(n)), $g_s(n)$ is an imaginary part of g(n), imag(g(n)), fm is a center frequency of the mth filter, and N is a number of taps in the filter.

3. The system of claim 1, wherein A(n) is an approximation of said amplitude computed using a CORDIC (COordinate Rotation DIgital Computer) or other computing device.

4. The system of claim 1, wherein said gain factor is computed using a lookup table.

5. A crest factor reduction system, the system comprising:
a peak amplitude suppressor for suppressing peak amplitudes of an input signal X(n) relative to an average value of the input signal and providing a peak amplitude suppressed signal with a reduced peak-to-average ratio (PAR) in response thereto;
said peak amplitude suppressor works on the input signal X(n), on a sample by sample basis, according to the following equation:

$X(n)=X(n)$ if $A(n)<T$ $X(n)=X(n)\cdot T/A(n)$ if $A(n) \geq T$ where A(n) is an approximation of an amplitude of an nth sample of said input signal X(n) or A(n) is an amplitude of an nth sample of said input signal X(n) given by $A(n)=\sqrt{real(X(n))^2+imag(X(n))^2}$, T is a clipping threshold of the peak amplitude suppressor, and T/A(n) is a gain factor of the nth sample of X(n); and
an intermodulation reject filter coupled to said peak amplitude suppressor for rejecting intermodulation distortion in said amplitude suppressed signal, said intermodulation reject filter's output being a peak suppressed version of said input signal,
wherein said intermodulation reject filter is a plurality of bandpass filters, one filter corresponding to each carrier present in said input signal, a passband of each of said filters centered on its corresponding carrier, with a delay at an output of each of said filters, and a summer for adding the outputs of the bandpass filters, and said bandpass filters are implemented by employing real and imaginary inputs according to the following equation for an even number of taps, N, $$X_o(n) = \sum_{k=0}^{(N-2)/2} (\text{Re}(X_i(n-k)) + \text{Re}(X_i(N-1-(-n-k))))g_c(k) -$$

$$\sum_{k=0}^{(N-2)/2} (\text{Im}(X_i(n-k)) - \text{Im}(X_i(N-1-(-n-k))))g_s(k) +$$

$$j\left\{\sum_{k=0}^{(N-2)/2} (\text{Re}(X_i(n-k)) + \text{Re}(X_i(N-1-(-n-k))))g_s(k) + \right.$$

$$\left.\sum_{k=0}^{(N-2)/2} \text{Im}(X_i(n-k)) - \text{Im}(X_i(N-1-(-n-k))))g_c(k)\right\},$$

and for an odd number of taps, N, $$X_o(n) = \left\{\sum_{k=0}^{(N-3)/2} (\text{Re}(X_i(n-k)) + \text{Re}(X_i(N-1-(-n-k))))g_c(k)\right\} +$$

$$\text{Re}(X_i(n-(N-1)/2))g_c((N-1)/2) -$$

$$\left[\left\{\sum_{k=0}^{(N-3)/2} (\text{Im}(X_i(n-k)) - \text{Im}(X_i(N-1-(-n-k))))g_s(k)\right\} + \right.$$

$$\left. \text{Im}(X_i(n-(N-1)/2))g_s((N-1)/2)\right] +$$

$$j\left[\left\{\sum_{k=0}^{(N-3)/2} (\text{Re}(X_i(n-k)) + \text{Re}(X_i(N-1-(-n-k))))g_s(k)\right\} + \right.$$

$$j\left(\text{Re}(X_i(n-(N-1)/2))g_s((N-1)/2) + \right.$$

$$\left.\left\{\sum_{k=0}^{(N-3)/2} \text{Im}(X_i(n-k)) - \text{Im}(X_i(N-1-(-n-k)))\right\}g_c(k)\right\} -$$

$$\left.\text{Im}(X_i(n-(N-1)/2))g_c((N-1)/2)\right]$$

where $X_i(n)$ is the input signal, $$\{g(n)\} = \sum_{m=1}^{M} w_m(n), n = 0:N-1,$$

$$\{w_m(n)\} = \{h_m(n)e^{j*2*pi*fm \cdot n}\}, m = 1:M$$

$h_m(n)$ are symmetric baseband filters, one per carrier of said input signal, $g_c(n)$ is a real part of g(n), real(g(n)), $g_s(n)$ is an imaginary part of g(n), imag(g(n)), fm is a center frequency of the mth filter, and N is a number of taps in the filter.

6. The system of claim 5, wherein said gain factor is computed using a lookup table.

7. The system of claim 5, wherein A(n) is an approximation of said amplitude computed using a CORDIC (COordinate Rotation DIgital Computer) or other computing device.

8. A crest factor reduction system, the system comprising:

a peak amplitude suppressor for suppressing peak amplitudes of an input signal X(n) relative to an average value of the input signal and providing a peak amplitude suppressed signal with a reduced peak-to-average ratio (PAR) in response thereto;

said peak amplitude suppressor works on the input signal X(n), on a sample by sample basis, according to the following equation:

$X(n)=X(n)$ if $A(n)<T$ $X(n)=X(n) \cdot T/A(n)$ if $A(n) \geq T$ where A(n) is an approximation of an amplitude of an nth sample of said input signal X(n) or A(n) is an amplitude of an nth sample of said input signal X(n) given by $A(n)=\sqrt{\text{real}(X(n))^2 + \text{imag}(X(n))^2}$, T is a clipping threshold of the peak amplitude suppressor, and T/A(n) is a gain factor of the nth sample of X(n); and an intermodulation reject filter coupled to said peak amplitude suppressor for rejecting intermodulation distortion in said amplitude suppressed signal, said intermodulation reject filter's output being a peak suppressed version of said input signal, wherein said intermodulation reject filter is a single filter whose coefficients are derived from a sum of band pass filters, one filter corresponding to each carrier present in said input signal, a passband of each of said filters centered on its corresponding carrier, and said band pass filters are implemented by employing real and imaginary inputs according to the following equation for an even number of taps, N, $$X_o(n) = \sum_{k=0}^{(N-2)/2} (\text{Re}(X_i(n-k)) + \text{Re}(X_i(N-1-(-n-k))))g_c(k) -$$

$$\sum_{k=0}^{(N-2)/2} (\text{Im}(X_i(n-k)) - \text{Im}(X_i(N-1-(-n-k))))g_s(k) +$$

$$j\left\{\sum_{k=0}^{(N-2)/2} (\text{Re}(X_i(n-k)) + \text{Re}(X_i(N-1-(-n-k))))g_s(k) + \right.$$

$$\left.\sum_{k=0}^{(N-2)/2} \text{Im}(X_i(n-k)) - \text{Im}(X_i(N-1-(-n-k))))g_c(k)\right\},$$

and for an odd number of taps, N, $$X_o(n) = \left\{\sum_{k=0}^{(N-3)/2} (\text{Re}(X_i(n-k)) + \text{Re}(X_i(N-1-(-n-k))))g_c(k)\right\} +$$

$$\text{Re}(X_i(n-(N-1)/2))g_c((N-1)/2) -$$

$$\left[\left\{\sum_{k=0}^{(N-3)/2} (\text{Im}(X_i(n-k)) - \text{Im}(X_i(N-1-(-n-k))))g_s(k)\right\} + \right.$$

$$\left. \text{Im}(X_i(n-(N-1)/2))g_s((N-1)/2)\right] +$$

$$j\left[\left\{\sum_{k=0}^{(N-3)/2} (\text{Re}(X_i(n-k)) + \text{Re}(X_i(N-1-(-n-k))))g_s(k)\right\} + \right.$$

$$j\left(\text{Re}(X_i(n-(N-1)/2))g_s((N-1)/2) + \right.$$

$$\left.\left\{\sum_{k=0}^{(N-3)/2} \text{Im}(X_i(n-k)) - \text{Im}(X_i(N-1-(-n-k)))\right\}g_c(k)\right\} -$$

$$\left.\text{Im}(X_i(n-(N-1)/2))g_c((N-1)/2)\right]$$

where $X_i(n)$ is the input signal,

-continued $$\{g(n)\} = \sum_{m=1}^{M} w_m(n), n = 0:N-1,$$

$$\{w_m(n)\} = \{h_m(n)e^{j*2*pi*fm\cdot n}\}, m = 1:M$$

$h_m(n)$ are symmetric baseband filters, one per carrier of said input signal, $g_c(n)$ is a real part of g(n), real(g(n)), $g_s(n)$ is an imaginary part of g(n), imag(g(n)), fm is a center frequency of the mth filter, and N is a number of taps in the filter.

9. The system of claim 8, wherein said gain factor is computed using a lookup table.

10. The system of claim 8, wherein A(n) is an approximation of said amplitude computed using a CORDIC (COordinate Rotation DIgital Computer) or other computing device.

11. A crest factor reduction method, the method comprising:

suppressing via a peak amplitude suppressor peak amplitudes of an input signal X(n) relative to an average value of the input signal and providing a peak amplitude suppressed signal with a reduced peak-to-average ratio (PAR) in response thereto;

said peak amplitude suppressor works on the input signal X(n), on a sample by sample basis, according to the following equation:

$X(n)=X(n)$ if $A(n)<T$ $X(n)=X(n)\cdot T/A(n)$ if $A(n)\geq T$ where A(n) is an approximation of an amplitude of an nth sample of said input signal X(n) or A(n) is an amplitude of an nth sample of said input signal X(n) given by $A(n)=\sqrt{\text{real}(X(n))^2+\text{imag}(X(n))^2}$, T is a clipping threshold of the peak amplitude suppressor, and T/A(n) is a gain factor of the nth sample of X(n); and rejecting intermodulation distortion in said amplitude suppressed signal via an intermodulation reject filter coupled to said peak amplitude suppressor, said intermodulation reject filter's output being a peak suppressed version of said input signal, wherein said intermodulation reject filter is a single filter whose coefficients are derived from frequency shifting and adding coefficients of a baseband-designed filter for a single carrier, a baseband-designed filter for two adjacent carriers, a baseband-designed filter for three adjacent carriers, up to a baseband-designed filter for M adjacent carriers where a largest filter of the adjacent carriers is used wherever the adjacent carriers are present and each of the carriers falls in a passband of exactly one of the frequency-shifted baseband-designed filters.

12. The method of claim 11, wherein said gain factor is computed using a lookup table.

13. The method of claim 11, wherein said intermodulation reject filter includes bandpass filters implemented by employing real and imaginary inputs according to the following equation for an even number of taps, N, $$X_o(n) = \sum_{k=0}^{(N-2)/2} (\text{Re}(X_i(n-k)) + \text{Re}(X_i(N-1-(-n-k))))g_c(k) -$$

$$\sum_{k=0}^{(N-2)/2} (\text{Im}(X_i(n-k)) - \text{Im}(X_i(N-1-(-n-k))))g_s(k) +$$

$$j\left\{\sum_{k=0}^{(N-2)/2} (\text{Re}(X_i(n-k)) + \text{Re}(X_i(N-1-(-n-k))))g_s(k) + \right.$$

$$\left.\sum_{k=0}^{(N-2)/2} \text{Im}(X_i(n-k)) - \text{Im}(X_i(N-1-(-n-k)))\right)g_c(k)\right\},$$

and for an odd number of taps, N, $$X_o(n) = \left\{\sum_{k=0}^{(N-3)/2} (\text{Re}(X_i(n-k)) + \text{Re}(X_i(N-1-(-n-k))))g_c(k)\right\} +$$

$$\text{Re}(X_i(n-(N-1)/2))g_c((N-1)/2) -$$

$$\left[\left\{\sum_{k=0}^{(N-3)/2} (\text{Im}(X_i(n-k)) - \text{Im}(X_i(N-1-(-n-k))))g_s(k)\right\} + \right.$$

$$\left.\text{Im}(X_i(n-(N-1)/2))g_s((N-1)/2)\right] +$$

$$j\left[\left\{\sum_{k=0}^{(N-3)/2} (\text{Re}(X_i(n-k)) + \text{Re}(X_i(N-1-(-n-k))))g_s(k)\right\} + \right.$$

$$j\left(\text{Re}(X_i(n-(N-1)/2))g_s((N-1)/2) + \right.$$

$$\left\{\sum_{k=0}^{(N-3)/2} \text{Im}(X_i(n-k)) - \text{Im}(X_i(N-1-(-n-k)))\right)g_c(k)\right\} -$$

$$\text{Im}(X_i(n-(N-1)/2))g_c((N-1)/2)\right]$$

where $X_i(n)$ is the input signal, $$\{g(n)\} = \sum_{m=1}^{M} w_m(n), n = 0:N-1,$$

$$\{w_m(n)\} = \{h_m(n)e^{j*2*pi*fm\cdot n}\}, m = 1:M$$

$h_m(n)$ are symmetric baseband filters, one per carrier of said input signal, $g_c(n)$ is a real part of g(n), real(g(n)), $g_s(n)$ is an imaginary part of g(n), imag(g(n)), fm is a center frequency of the mth filter, and N is a number of taps in the filter.

14. The method of claim 11, wherein A(n) is an approximation of said amplitude computed using a CORDIC (COordinate Rotation DIgital Computer) or other computing device.

15. A crest factor reduction method, the method comprising:

suppressing via a peak amplitude suppressor peak amplitudes of an input signal X(n) relative to an average value of the input signal and providing a peak amplitude suppressed signal with a reduced peak-to-average ratio (PAR) in response thereto;

said peak amplitude suppressor works on the input signal X(n), on a sample by sample basis, according to the following equation:

$X(n)=X(n)$ if $A(n)<T$ $X(n)=X(n) \cdot T/A(n)$ if $A(n) \geq T$ where A(n) is an approximation of an amplitude of an nth sample of said input signal X(n) or A(n) is an amplitude of an nth sample of said input signal X(n) given by $A(n)=\sqrt{\text{real}(X(n))^2 + \text{imag}(X(n))^2}$, T is a clipping threshold of the peak amplitude suppressor, and T/A(n) is a gain factor of the nth sample of X(n); and rejecting intermodulation distortion in said amplitude suppressed signal via an intermodulation reject filter coupled to said peak amplitude suppressor, said intermodulation reject filter's output being a peak suppressed version of said input signal, wherein said intermodulation reject filter is a plurality of bandpass filters, one filter corresponding to each carrier present in said input signal, a passband of each of said filters centered on its corresponding carrier, with a delay at an output of each of said filters, and a summer for adding the outputs of the bandpass filters, and said bandpass filters are implemented by employing real and imaginary inputs according to the following equation for an even number of taps, N, $$X_o(n) = \sum_{k=0}^{(N-2)/2} (\text{Re}(X_i(n-k)) + \text{Re}(X_i(N-1-(-n-k))))g_c(k) -$$

$$\sum_{k=0}^{(N-2)/2} (\text{Im}(X_i(n-k)) - \text{Im}(X_i(N-1-(-n-k))))g_s(k) +$$

$$j\left\{ \sum_{k=0}^{(N-2)/2} (\text{Re}(X_i(n-k)) + \text{Re}(X_i(N-1-(-n-k))))g_s(k) + \sum_{k=0}^{(N-2)/2} \text{Im}(X_i(n-k)) - \text{Im}(X_i(N-1-(-n-k))) \right\} g_c(k) \right\},$$

and for an odd number of taps, N, $$X_o(n) = \left\{ \sum_{k=0}^{(N-3)/2} (\text{Re}(X_i(n-k)) + \text{Re}(X_i(N-1-(-n-k))))g_c(k) \right\} +$$

$$\left[ \left\{ \sum_{k=0}^{(N-3)/2} (\text{Im}(X_i(n-k)) - \text{Im}(X_i(N-1-(-n-k))))g_s(k) \right\} + \right.$$

$$\text{Re}(X_i(n-(N-1)/2))g_c((N-1)/2) -$$

$$\left. \text{Im}(X_i(n-(N-1)/2))g_s((N-1)/2) \right] +$$

$$j\left[ \left\{ \sum_{k=0}^{(N-3)/2} (\text{Re}(X_i(n-k)) + \text{Re}(X_i(N-1-(-n-k))))g_s(k) \right\} + \right.$$

$$j\left( \text{Re}(X_i(n-(N-1)/2))g_s((N-1)/2) + \right.$$

$$\left. \left\{ \sum_{k=0}^{(N-3)/2} \text{Im}(X_i(n-k)) - \text{Im}(X_i(N-1-(-n-k))) \right\} g_c(k) \right\} -$$

$$\left. \text{Im}(X_i(n-(N-1)/2))g_c((N-1)/2) \right]$$

where $X_i(n)$ is the input signal,

-continued $$\{g(n)\} = \sum_{m=1}^{M} w_m(n), n = 0:N-1,$$

$$\{w_m(n)\} = \{h_m(n)e^{j*2*pi*fm \cdot n}\}, m = 1:M$$

$h_m(n)$ are symmetric baseband filters, one per carrier of said input signal, $g_c(n)$ is a real part of g(n), real(g(n)), $g_s(n)$ is an imaginary part of g(n), imag(g(n)), fm is a center frequency of the mth filter, and N is a number of taps in the filter.

16. The method of claim 15, wherein said gain factor is computed using a lookup table.

17. The method of claim 15, wherein A(n) is an approximation of said amplitude computed using a CORDIC (COordinate Rotation DIgital Computer) or other computing device.

18. A crest factor reduction method, the method comprising:

suppressing via a peak amplitude suppressor peak amplitudes of an input signal X(n) relative to an average value of the input signal and providing a peak amplitude suppressed signal with a reduced peak-to-average ratio (PAR) in response thereto;

said peak amplitude suppressor works on the input signal X(n), on a sample by sample basis, according to the following equation:

$X(n)=X(n)$ if $A(n)<T$ $X(n)=X(n) \cdot T/A(n)$ if $A(n) \geq T$ where A(n) is an approximation of an amplitude of an nth sample of said input signal X(n) or A(n) is an amplitude of an nth sample of said input signal X(n) given by $A(n)=\sqrt{\text{real}(X(n))^2 + \text{imag}(X(n))^2}$, T is a clipping threshold of the peak amplitude suppressor, and T/A(n) is a gain factor of the nth sample of X(n); and rejecting intermodulation distortion in said amplitude suppressed signal via an intermodulation reject filter coupled to said peak amplitude suppressor, said intermodulation reject filter's output being a peak suppressed version of said input signal, wherein said intermodulation reject filter is a single filter whose coefficients are derived from a sum of band pass filters, one filter corresponding to each carrier present in said input signal, a passband of each of said filters centered on its corresponding carrier, and said band pass filters are implemented by employing real and imaginary inputs according to the following equation for an even number of taps, N, $$X_o(n) = \sum_{k=0}^{(N-2)/2} (\text{Re}(X_i(n-k)) + \text{Re}(X_i(N-1-(-n-k))))g_c(k) -$$

$$\sum_{k=0}^{(N-2)/2} (\text{Im}(X_i(n-k)) - \text{Im}(X_i(N-1-(-n-k))))g_s(k) +$$

$$j\left\{ \sum_{k=0}^{(N-2)/2} (\text{Re}(X_i(n-k)) + \text{Re}(X_i(N-1-(-n-k))))g_s(k) + \right.$$

-continued $$\sum_{k=0}^{(N-2)/2} \mathrm{Im}(X_i(n-k)) - \mathrm{Im}(X_i(N-1-(-n-k))) \bigg) g_c(k) \bigg\},$$

and for an odd number of taps, $N$, $$X_o(n) = \left\{ \sum_{k=0}^{(N-3)/2} (\mathrm{Re}(X_i(n-k)) + \mathrm{Re}(X_i(N-1-(-n-k)))) g_c(k) \right\} +$$

$$\mathrm{Re}(X_i(n-(N-1)/2)) g_c((N-1)/2) -$$

$$\left[ \left\{ \sum_{k=0}^{(N-3)/2} (\mathrm{Im}(X_i(n-k)) - \mathrm{Im}(X_i(N-1-(-n-k)))) g_s(k) \right\} +$$

$$\mathrm{Im}(X_i(n-(N-1)/2)) g_s((N-1)/2) \right] +$$

$$j\left[ \left\{ \sum_{k=0}^{(N-3)/2} (\mathrm{Re}(X_i(n-k)) + \mathrm{Re}(X_i(N-1-(-n-k)))) g_s(k) \right\} +$$

$$j\bigg( \mathrm{Re}(X_i(n-(N-1)/2)) g_s((N-1)/2) +$$

$$\left\{ \sum_{k=0}^{(N-3)/2} \mathrm{Im}(X_i(n-k)) - \mathrm{Im}(X_i(N-1-(-n-k))) \bigg) g_c(k) \right\} -$$

$$\mathrm{Im}(X_i(n-(N-1)/2)) g_c((N-1)/2) \bigg) \right]$$

where $X_i(n)$ is the input signal, $$\{g(n)\} = \sum_{m=1}^{M} w_m(n),\ n = 0:N-1,$$

$$\{w_m(n)\} = \{h_m(n) e^{j*2*pi*fm\cdot n}\},\ m = 1:M$$

$h_m(n)$ are symmetric baseband filters, one per carrier of said input signal, $g_c(n)$ is a real part of $g(n)$, real($g(n)$), $g_s(n)$ is an imaginary part of $g(n)$, imag($g(n)$), fm is a center frequency of the mth filter, and N is a number of taps in the filter.

19. The method of claim 18, wherein said gain factor is computed using a lookup table.

20. The system of claim 18, wherein A(n) is an approximation of said amplitude computed using a CORDIC (COordinate Rotation DIgital Computer) or other computing device.

21. A computer program product for crest factor reduction, and including one or more computer readable instructions embedded on a tangible computer readable medium and configured to cause one or more computer processors to perform the steps of:

suppressing via a peak amplitude suppressor peak amplitudes of an input signal X(n) relative to an average value of the input signal and providing a peak amplitude suppressed signal with a reduced peak-to-average ratio (PAR) in response thereto;

said peak amplitude suppressor works on the input signal X(n), on a sample by sample basis, according to the following equation:

$X(n)=X(n)$ if $A(n)<T$ $X(n)=X(n)\cdot T/A(n)$ if $A(n)\geq T$ where A(n) is an approximation of an amplitude of an nth sample of said input signal X(n) or A(n) is an amplitude of an nth sample of said input signal X(n) given by $A(n)= \sqrt{\mathrm{real}(X(n))^2 + \mathrm{imag}(X(n))^2}$, T is a clipping threshold of the peak amplitude suppressor, and T/A(n) is a gain factor of the nth sample of X(n); and rejecting intermodulation distortion in said amplitude suppressed signal via an intermodulation reject filter coupled to said peak amplitude suppressor, said intermodulation reject filter's output being a peak suppressed version of said input signal, wherein said intermodulation reject filter is a single filter whose coefficients are derived from frequency shifting and adding coefficients of a baseband-designed filter for a single carrier, a baseband-designed filter for two adjacent carriers, a baseband-designed filter for three adjacent carriers, up to a baseband-designed filter for M adjacent carriers where a largest filter of the adjacent carriers is used wherever the adjacent carriers are present and each of the carriers falls in a passband of exactly one of the frequency-shifted baseband-designed filters.

22. The computer program product of claim 21, wherein said gain factor is computed using a lookup table.

23. The computer program product of claim 21, wherein said intermodulation reject filter includes bandpass filters implemented by employing real and imaginary inputs according to the following equation for an even number of taps, N, $$X_o(n) = \sum_{k=0}^{(N-2)/2} (\mathrm{Re}(X_i(n-k)) + \mathrm{Re}(X_i(N-1-(-n-k)))) g_c(k) -$$

$$\sum_{k=0}^{(N-2)/2} (\mathrm{Im}(X_i(n-k)) - \mathrm{Im}(X_i(N-1-(-n-k)))) g_s(k) +$$

$$j\left\{ \sum_{k=0}^{(N-2)/2} (\mathrm{Re}(X_i(n-k)) + \mathrm{Re}(X_i(N-1-(-n-k)))) g_s(k) + \right.$$

$$\left. \sum_{k=0}^{(N-2)/2} \mathrm{Im}(X_i(n-k)) - \mathrm{Im}(X_i(N-1-(-n-k))) \bigg) g_c(k) \right\},$$

and for an odd number of taps, $N$, $$X_o(n) = \left\{ \sum_{k=0}^{(N-3)/2} (\mathrm{Re}(X_i(n-k)) + \mathrm{Re}(X_i(N-1-(-n-k)))) g_c(k) \right\} +$$

$$\mathrm{Re}(X_i(n-(N-1)/2)) g_c((N-1)/2) -$$

$$\left[ \left\{ \sum_{k=0}^{(N-3)/2} (\mathrm{Im}(X_i(n-k)) - \mathrm{Im}(X_i(N-1-(-n-k)))) g_s(k) \right\} +$$

$$\mathrm{Im}(X_i(n-(N-1)/2)) g_s((N-1)/2) \right] +$$

$$j\left[ \left\{ \sum_{k=0}^{(N-3)/2} (\mathrm{Re}(X_i(n-k)) + \mathrm{Re}(X_i(N-1-(-n-k)))) g_s(k) \right\} +$$

$$j\bigg( \mathrm{Re}(X_i(n-(N-1)/2)) g_s((N-1)/2) +$$

$$\left\{ \sum_{k=0}^{(N-3)/2} \mathrm{Im}(X_i(n-k)) - \mathrm{Im}(X_i(N-1-(-n-k))) \bigg) g_c(k) \right\} -$$

$$\mathrm{Im}(X_i(n-(N-1)/2)) g_c((N-1)/2) \bigg) \right]$$

where $X_i(n)$ is the input signal,

-continued $$\{g(n)\} = \sum_{m=1}^{M} w_m(n), n = 0:N-1,$$

$$\{w_m(n)\} = \{h_m(n)e^{j*2*pi*fm\cdot n}\}, m = 1:M$$

$h_m(n)$ are symmetric baseband filters, one per carrier of said input signal, $g_c(n)$ is a real part of g(n), real(g(n)), $g_s(n)$ is an imaginary part of g(n), imag(g(n)), fm is a center frequency of the mth filter, and N is a number of taps in the filter.

24. The computer program product of claim 21, wherein A(n) is an approximation of said amplitude computed using a CORDIC (COordinate Rotation DIgital Computer) or other computing device.

25. A computer program product for crest factor reduction, and including one or more computer readable instructions embedded on a tangible computer readable medium and configured to cause one or more computer processors to perform the steps of:

suppressing via a peak amplitude suppressor peak amplitudes of an input signal X(n) relative to an average value of the input signal and providing a peak amplitude suppressed signal with a reduced peak-to-average ratio (PAR) in response thereto;

said peak amplitude suppressor works on the input signal X(n), on a sample by sample basis, according to the following equation:

$X(n)=X(n)$ if $A(n)<T$ $X(n)=X(n)\cdot T/A(n)$ if $A(n) \geq T$ where A(n) is an approximation of an amplitude of an nth sample of said input signal X(n) or A(n) is an amplitude of an nth sample of said input signal X(n) given by $A(n) = \sqrt{\text{real}(X(n))^2 + \text{imag}(X(n))^2}$, T is a clipping threshold of the peak amplitude suppressor, and T/A(n) is a gain factor of the nth sample of X(n); and rejecting intermodulation distortion in said amplitude suppressed signal via an intermodulation reject filter coupled to said peak amplitude suppressor, said intermodulation reject filter's output being a peak suppressed version of said input signal, wherein said intermodulation reject filter is a plurality of bandpass filters, one filter corresponding to each carrier present in said input signal, a passband of each of said filters centered on its corresponding carrier, with a delay at an output of each of said filters, and a summer for adding the outputs of the bandpass filters, and said bandpass filters are implemented by employing real and imaginary inputs according to the following equation for an even number of taps, N, $$X_o(n) = \sum_{k=0}^{(N-2)/2} (\text{Re}(X_i(n-k)) + \text{Re}(X_i(N-1-(-n-k))))g_c(k) -$$

$$\sum_{k=0}^{(N-2)/2} (\text{Im}(X_i(n-k)) - \text{Im}(X_i(N-1-(-n-k))))g_s(k) +$$

$$j\left\{\sum_{k=0}^{(N-2)/2} (\text{Re}(X_i(n-k)) + \text{Re}(X_i(N-1-(-n-k))))g_s(k) + \sum_{k=0}^{(N-2)/2} \text{Im}(X_i(n-k)) - \text{Im}(X_i(N-1-(-n-k)))\right]g_c(k)\right\},$$

and for an odd number of taps, N, $$X_o(n) = \left\{\sum_{k=0}^{(N-3)/2} (\text{Re}(X_i(n-k)) + \text{Re}(X_i(N-1-(-n-k))))g_c(k)\right\} +$$

$$\text{Re}(X_i(n-(N-1)/2))g_c((N-1)/2) -$$

$$\left[\left\{\sum_{k=0}^{(N-3)/2} (\text{Im}(X_i(n-k)) - \text{Im}(X_i(N-1-(-n-k))))g_s(k)\right\} +$$

$$\text{Im}(X_i(n-(N-1)/2))g_s((N-1)/2)\right] +$$

$$j\left[\left\{\sum_{k=0}^{(N-3)/2} (\text{Re}(X_i(n-k)) + \text{Re}(X_i(N-1-(-n-k))))g_s(k)\right\} +$$

$$j\left(\text{Re}(X_i(n-(N-1)/2))g_s((N-1)/2) +\right.$$

$$\left\{\sum_{k=0}^{(N-3)/2} \text{Im}(X_i(n-k)) - \text{Im}(X_i(N-1-(-n-k)))\right\}g_c(k)\right\} -$$

$$\text{Im}(X_i(n-(N-1)/2))g_c((N-1)/2)\right]$$

where $X_i(n)$ is the input signal, $$\{g(n)\} = \sum_{m=1}^{M} w_m(n), n = 0:N-1,$$

$$\{w_m(n)\} = \{h_m(n)e^{j*2*pi*fm\cdot n}\}, m = 1:M$$

$h_m(n)$ are symmetric baseband filters, one per carrier of said input signal, $g_c(n)$ is a real part of g(n), real(g(n)), $g_s(n)$ is an imaginary part of g(n), imag(g(n)), fm is a center frequency of the mth filter, and N is a number of taps in the filter.

26. The computer program product of claim 25, wherein said gain factor is computed using a lookup table.

27. The computer program product of claim 25, wherein A(n) is an approximation of said amplitude computed using a CORDIC (COordinate Rotation DIgital Computer) or other computing device.

28. A computer program product for crest factor reduction, and including one or more computer readable instructions embedded on a tangible computer readable medium and configured to cause one or more computer processors to perform the steps of:

suppressing via a peak amplitude suppressor peak amplitudes of an input signal X(n) relative to an average value of the input signal and providing a peak amplitude suppressed signal with a reduced peak-to-average ratio (PAR) in response thereto;

said peak amplitude suppressor works on the input signal X(n), on a sample by sample basis, according to the following equation:

$X(n)=X(n)$ if $A(n)<T$ $X(n)=X(n)\cdot T/A(n)$ if $A(n) \geq T$ where A(n) is an approximation of an amplitude of an nth sample of said input signal X(n) or A(n) is an amplitude of an nth sample of said input signal X(n) given by $A(n)=\sqrt{\text{real}(X(n))^2+\text{imag}(X(n))^2}$, T is a clipping threshold of the peak amplitude suppressor, and T/A(n) is a gain factor of the nth sample of X(n); and rejecting intermodulation distortion in said amplitude suppressed signal via an intermodulation reject filter coupled to said peak amplitude suppressor, said intermodulation reject filter's output being a peak suppressed version of said input signal, wherein said intermodulation reject filter is a single filter whose coefficients are derived from a sum of band pass filters, one filter corresponding to each carrier present in said input signal, a passband of each of said filters centered on its corresponding carrier, and said band pass filters are implemented by employing real and imaginary inputs according to the following equation for an even number of taps, N, $$X_o(n) = \sum_{k=0}^{(N-2)/2} (\text{Re}(X_i(n-k)) + \text{Re}(X_i(N-1-(-n-k))))g_c(k) -$$

$$\sum_{k=0}^{(N-2)/2} (\text{Im}(X_i(n-k)) - \text{Im}(X_i(N-1-(-n-k))))g_s(k) +$$

$$j\left\{\sum_{k=0}^{(N-2)/2} (\text{Re}(X_i(n-k)) + \text{Re}(X_i(N-1-(-n-k))))g_s(k) + \sum_{k=0}^{(N-2)/2} \text{Im}(X_i(n-k)) - \text{Im}(X_i(N-1-(-n-k)))\right]g_c(k)\right\},$$

and for an odd number of taps, N, $$X_o(n) = \left\{\sum_{k=0}^{(N-3)/2} (\text{Re}(X_i(n-k)) + \text{Re}(X_i(N-1-(-n-k))))g_c(k)\right\} +$$

$$\text{Re}(X_i(n-(N-1)/2))g_c((N-1)/2) -$$

$$\left[\left\{\sum_{k=0}^{(N-3)/2} (\text{Im}(X_i(n-k)) - \text{Im}(X_i(N-1-(-n-k))))g_s(k)\right\} + \text{Im}(X_i(n-(N-1)/2))g_s((N-1)/2)\right] +$$

$$j\left[\left\{\sum_{k=0}^{(N-3)/2} (\text{Re}(X_i(n-k)) + \text{Re}(X_i(N-1-(-n-k))))g_s(k)\right\} + \text{Re}(X_i(n-(N-1)/2))g_s((N-1)/2) + \left\{\sum_{k=0}^{(N-3)/2} \text{Im}(X_i(n-k)) - \text{Im}(X_i(N-1-(-n-k)))\right\}g_c(k)\right] -$$

$$\text{Im}(X_i(n-(N-1)/2))g_c((N-1)/2)\right]$$

where $X_i(n)$ is the input signal, $$\{g(n)\} = \sum_{m=1}^{M} w_m(n), n = 0:N-1,$$

$$\{w_m(n)\} = \{h_m(n)e^{j*2*pi*fm\cdot n}\}, m = 1:M$$

$h_m(n)$ are symmetric baseband filters, one per carrier of said input signal, $g_c(n)$ is a real part of g(n), real(g(n)), $g_s(n)$ is an imaginary part of g(n), imag(g(n)), fm is a center frequency of the mth filter, and N is a number of taps in the filter.

29. The computer program product of claim 28, wherein said gain factor is computed using a lookup table.

30. The computer program product of claim 28, wherein A(n) is an approximation of said amplitude computed using a CORDIC (COordinate Rotation DIgital Computer) or other computing device.

* * * * *